United States Patent
Kobayashi

(10) Patent No.: US 9,824,096 B2
(45) Date of Patent: *Nov. 21, 2017

(54) ELECTRONIC APPARATUS, INFORMATION DETERMINING SERVER, INFORMATION DETERMINING METHOD, PROGRAM, AND INFORMATION DETERMINING SYSTEM

(71) Applicant: Sony Corporation, Tokyo (JP)

(72) Inventor: Kenichiro Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,157

(22) Filed: Jul. 25, 2016

(65) Prior Publication Data

US 2016/0334497 A1 Nov. 17, 2016

Related U.S. Application Data

(63) Continuation of application No. 13/196,331, filed on Aug. 2, 2011.

(30) Foreign Application Priority Data

Aug. 12, 2010 (JP) .................................. 2010-180797

(51) Int. Cl.
*G06F 17/30* (2006.01)
*H04W 4/02* (2009.01)
(Continued)

(52) U.S. Cl.
CPC ...... *G06F 17/30241* (2013.01); *G01S 5/0263* (2013.01); *G06Q 50/00* (2013.01);
(Continued)

(58) Field of Classification Search
CPC .... G06Q 50/01; G06Q 30/02; G06Q 30/0269; G06Q 10/0833; G06Q 30/0242;
(Continued)

(56) References Cited

U.S. PATENT DOCUMENTS

2002/0116266 A1 8/2002 Marshall
2003/0055983 A1* 3/2003 Callegari .......... G06F 17/30241
709/227

(Continued)

FOREIGN PATENT DOCUMENTS

JP 11-51663 2/1999
JP 2007-264764 10/2007
(Continued)

OTHER PUBLICATIONS

Chinese Office Action dated Aug. 5, 2016 in connection with Chinese Application No. 201110227801.8.
(Continued)

*Primary Examiner* — Nizar Sivji
(74) *Attorney, Agent, or Firm* — Wolf, Greenfield & Sacks, P.C.

(57) ABSTRACT

A method is provided for determining a category of a location. The method comprises determining, at a first time, information identifying a first device location of a first device associated with a user; and storing the first device location information and information identifying the first time in a location history. The method further comprises determining, at a second time, information identifying a second device location of the first device; and storing, in the location history, the second device location information and information identifying the second time. The method still further comprises determining, based on the location history, a category of a location.

31 Claims, 16 Drawing Sheets

(51) Int. Cl.
*G06Q 50/00* (2012.01)
*G09B 29/10* (2006.01)
*G01S 5/02* (2010.01)
*H04W 64/00* (2009.01)

(52) U.S. Cl.
CPC ............ *G09B 29/10* (2013.01); *H04W 4/028* (2013.01); *H04W 64/00* (2013.01)

(58) Field of Classification Search
CPC ............... G06Q 30/0631; G06Q 20/20; G06Q 30/0255; G06Q 30/0261; G06Q 30/0271; G06Q 30/0272; G06Q 30/0276; G06Q 30/0283; G06F 17/30867; G06F 17/30
See application file for complete search history.

(56) References Cited

U.S. PATENT DOCUMENTS

| | | |
|---|---|---|
| 2006/0156209 A1 | 7/2006 | Matsuura et al. |
| 2009/0258656 A1 | 10/2009 | Wang et al. |
| 2010/0004997 A1* | 1/2010 | Mehta .................... G06Q 30/02 705/14.66 |
| 2010/0076994 A1 | 3/2010 | Soroca et al. |
| 2010/0325269 A1 | 12/2010 | Kim et al. |
| 2011/0071881 A1* | 3/2011 | Zheng .................... G06Q 30/02 705/7.34 |
| 2012/0040688 A1 | 2/2012 | Kobayashi |
| 2012/0184287 A1 | 7/2012 | Jovicic et al. |

FOREIGN PATENT DOCUMENTS

| | | |
|---|---|---|
| JP | 2010-072828 | 4/2010 |
| JP | 2010-079608 | 4/2010 |
| WO | WO 2009/151925 | 12/2009 |

OTHER PUBLICATIONS

Japanese Office Action dated Jan. 21, 2014 in connection with Japanese Application No. 2010-180797.
Japanese Office Action dated Jul. 8, 2014 in connection with Japanese Application No. 2010-180797.
Miyazaki, Development of Action Estimation Technology for Achieving Service in Accordance with Action of User, NTT DOCOMO Technical Journal, Telecommunications Association in Japan, Oct. 1, 2009, vol. 17, No. 3, pp. 55-61.
U.S. Appl. No. 13/196,331, filed Aug. 2, 2011, Kobayashi.
Chinese Office Action dated Sep. 8, 2015 in connection with Chinese Application No. 201110227801.8, and English translation thereof.

* cited by examiner

HISTORY INFORMATION

| CURRENT POSITION INFORMATION | | TIME INFORMATION |
|---|---|---|
| LATITUDE | LONGITUDE | |
| 35.681382 | 139.766084 | 07/01/2010 10:30 |
| 35.995618 | 138.500691 | 07/01/2010 10:45 |
| 35.755915 | 138.791254 | 07/01/2010 11:59 |
| ⋮ | ⋮ | ⋮ |

○ SET VALUE:
RANGE RADIUS (N) km N = 3
PERIOD STAYING (T) TIME/PERIOD (W) DAY T = 5, T = 2

| POSITION INFORMATION | | STAYING TIME IN SET PERIOD | LIFT ZONE DETERMINATION |
| --- | --- | --- | --- |
| LATITUDE | LONGITUDE | | |
| 35.681382 | 139.766084 | 10:25:10 | ○ |
| 35.586712 | 137.042356 | 0:10:24 | × |
| 36.124567 | 138.164256 | 20:00:45 | ○ |
| ⋮ | ⋮ | ⋮ | ⋮ |

ELECTRONIC APPARATUS, INFORMATION DETERMINING SERVER, INFORMATION DETERMINING METHOD, PROGRAM, AND INFORMATION DETERMINING SYSTEM

CROSS REFERENCE TO RELATED APPLICATIONS

This application is a continuation of U.S. application Ser. No. 13/196,331, filed Aug. 2, 2011, which claims the benefit under 35 U.S.C. §119 of the filing date of Japanese Patent Application No. JP 2010-180797, filed Aug. 12, 2010. The entirety of each of the foregoing documents is incorporated herein by reference.

BACKGROUND

The present disclosure relates to an electronic apparatus, an information determining server, an information determining method, a program, and an information determining system.

A device measuring a current position using a satellite positioning system such as GPS (Global Positioning System) and displaying the measured current position on a map is proposed along with the development of information processing technology (for example, see Japanese Unexamined Patent Application Publication No. 11-51663).

SUMMARY

In the device described in Japanese Unexamined Patent Application Publication No. 11-51663, there are attempts to memorize home or facilities such as a work place, a school, or a restaurant which are ordinarily used in daily life. However, to memorize such facilities in the device, it is necessary for a user to designate the position of the facilities which the user wants to register in the device, and the necessary operation lowers convenience for the user.

It is desirable to provide an electronic apparatus, an information determining server, an information determining method, a program, and an information determining system, capable of automatically determining a life zone where a carrier of a device ordinarily visits in daily life.

Accordingly, there is provided a method for determining a category of a location. The method comprises determining, at a first time, information identifying a first device location of a first device associated with a user; and storing the first device location information and information identifying the first time in a location history. The method further comprises determining, at a second time, information identifying a second device location of the first device; and storing, in the location history, the second device location information and information identifying the second time. The method still further comprises determining, based on the location history, a category of a location.

In a second aspect, there is provided a non-transitory computer-readable medium storing instructions, which when executed by a computer, perform a method of determining a category of a location. The method comprises determining, at a first time, information identifying a first device location of a first device associated with a user; and storing the first device location information and information identifying the first time in a location history. The method further comprises determining, at a second time, information identifying a second device location of the first device; and storing, in the location history, the second device location information and information identifying the second time. The method still further comprises determining, based on the location history, a category of a location.

In a third aspect, there is provided an apparatus for determining a category of a location, comprising: a memory; and a processor executing instructions stored in the memory. The processor executes instructions stored in the memory to determine, at a first time, information identifying a first device location of a first device associated with a user. The processor further executes instructions stored in the memory to determine, at a second time, information identifying a second device location of the first device. The processor still further executes instructions stored in the memory to identify a category of a location, the category being based on a location history containing: the first device location information; information identifying the first time; the second device location information; and information identifying the second time.

In a fourth aspect, there is provided an apparatus for determining a category of a location, comprising: a memory; and a processor executing instructions stored in the memory. The processor executes instructions stored in the memory to receive, from a first device associated with a user, information identifying a first device location of the first device, the first device location information determined by the first device at a first time; and store the first device location information and information identifying the first time in a location history. The processor further executes instructions stored in the memory to receive, from the first device, information identifying a second device location of the first device, the second device location information determined by the first device at a second time; and store, in the location history, the second device location information and information identifying the second time. The processor still further executes instructions stored in the memory to determine, based on the location history, a category of a location; and send the category to the first device.

According to the disclosure as described above, it is possible to automatically determine the life zone that is the areas where the carrier of the apparatus ordinarily visits in daily life.

DETAILED DESCRIPTION OF EMBODIMENTS

Figure 1:
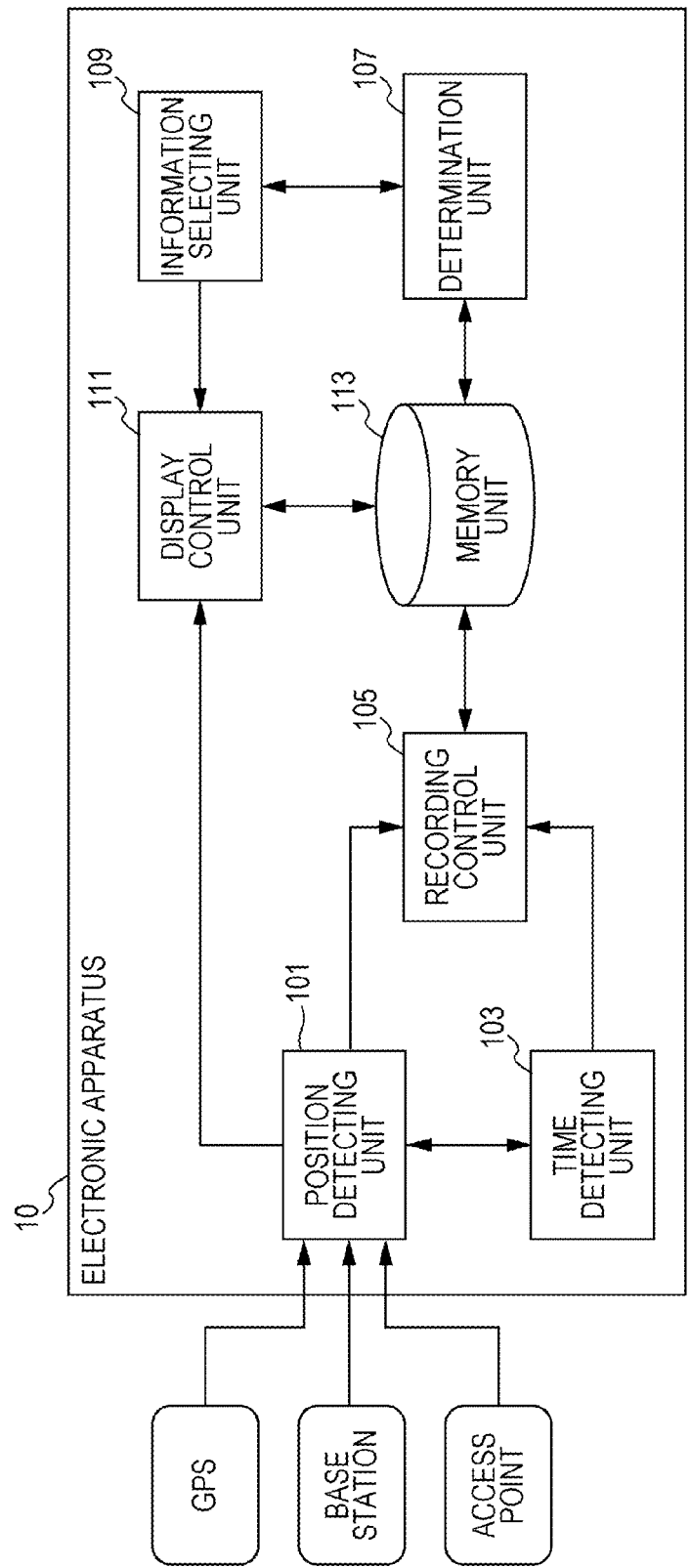
FIG. 1 is a block diagram illustrating a configuration of an electronic apparatus according to a first embodiment of the disclosure.

Hereinafter, preferred embodiments of the disclosure will be described in detail with reference to the accompanying drawings. The same reference numerals and signs are given to the constituent elements having substantially the same functional configuration, and repeated descriptions are omitted.

The description will be described in the following order.
1. First Embodiment
1-1. Configuration of Electronic Apparatus
1-2. Specific Example of Life Zone Determining Method
1-3. Flow of Life Zone Determining Method
1-4. Flow of Information Selecting Method
2. Second Embodiment
2-1. Configuration of Electronic Apparatus
2-2. Configuration of Information Determining Server
2-3. Flow of Life Zone Determining Method
2-4. Flow of Information Selecting Method
3. Hardware Configuration of Electronic Apparatus According to Embodiment of Disclosure
4. Conclusion

First Embodiment

Configuration of Electronic Apparatus

First, a configuration of an electronic apparatus, that is, a device associated with a user, according to a first embodiment of the disclosure will be described in detail with reference to FIG. 1. FIG. 1 is a block diagram illustrating a configuration of an electronic apparatus according to the embodiment.

As shown in FIG. 1, the electronic apparatus 10 according to the embodiment mainly includes a position detecting unit 101, a time detecting unit 103, a recording control unit 105, a determination unit 107, an information selecting unit 109, a display control unit 111, and a memory unit 113.

The position detecting unit 101 is realized by, for example, a CPU (Central Processing Unit), a ROM (Read Only Memory), a RAM (Random Access Memory), a communication device, and the like. The position detecting unit 101 detects a current position of the electronic apparatus 10, that is, a device location, using a GPS, a base station used for mobile communication such as a mobile phone, and an access point or a wireless base station used by RFID (Radio Frequency Identification) or Wi-Fi.

When the position detecting unit 101 detects the current position of the electronic apparatus 10, the position detecting unit 101 outputs information (hereinafter, also referred to as current position information) representing the detected current position to the recording control unit 105 to be described later. An example of the current position information may be information about the latitude and longitude of the current position. The current position information is not limited to the information about latitude and longitude of the current position, and may be arbitrary information capable of uniquely specifying the current position.

The position detecting unit 101 may detect the current position of the electronic apparatus 10 at an arbitrary timing. For example, the position detecting unit 101 may constantly detect the current position of the electronic apparatus 10, or may detect the current position at every predetermined period.

The position detecting unit 101 may output the current position information about the detected current position to the recording control unit 105 at an arbitrary timing. For example, the position detecting unit 101 may output the generated current position information to the recording control unit 105 whenever the current position is detected and the current position information is generated. When the current position is changed, the position detecting unit 101 may output the current position information about the changed current position to the recording control unit 105.

The current position information is information which may be changed even by a slight deviation of the position of the electronic apparatus 10. For this reason, the current position information may be changed even when it is considered that the change of the current position of the electronic apparatus 10 is small and the electronic apparatus 10 is located substantially at the same position. Accordingly, when the current position information is output according to the change of the current position, a threshold area for determining whether or not the electronic apparatus 10 is moved may be preset and the position detecting unit 101 may determine that the current position is changed when the electronic apparatus 10 is moved over the threshold area.

Figures 2, 3:
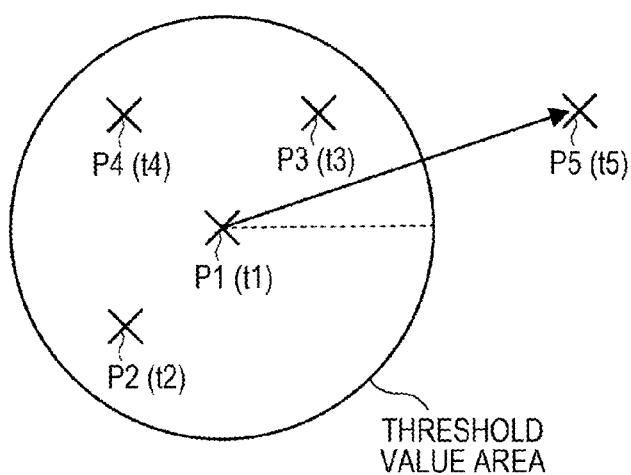
FIG. 2 is an explanatory diagram explaining the electronic apparatus according to the embodiment.
FIG. 3 is an explanatory diagram illustrating one example of history information according to the embodiment.

FIG. 2 is a diagram illustrating an example of a method of determining whether or not the current position is changed. For example, as shown in FIG. 2, it is assumed that the electronic apparatus 10 is located at the position P1 at the time t1. In this case, in the position detecting unit 101, the threshold area for determining whether or not the current position is changed, such as "radius 20 m from the noted point". As shown in FIG. 2, the position P2 at the time t2, the position P3 at the time t3, and the position P4 at the time t4 are positions located in the threshold area centered on the position P1. Accordingly, in the position P1 to the position P4, the position detecting unit 101 determines that there is no change in the current position. Meanwhile, the position P5 at the time t5 is a position in the range out of the threshold area shown in FIG. 2. Accordingly, when the position detecting unit 101 acquires the current position information about the position P5, the position detecting unit 101 outputs the current position information about the acquired position P5 to the recording control unit 105. As a result, the recording control unit 105 records history information when the current position of the electronic apparatus 10 is changed.

The time detecting unit 103 is realized by, for example, a CPU, a ROM, a RAM, a communication device, and the like. The time detecting unit 103 detects the time corresponding to the current position, and outputs information (hereinafter, also referred to as time information) representing the detected time to the recording control unit 105 to be described later. The time detecting unit 103 may detect the time corresponding to the current position using a clock function of the electronic apparatus 10. The time detecting unit 103 may detect the time corresponding to the current position with reference to data from GPS or the like acquired by the position detecting unit 101, and may detect the time with reference to an external server such as a time server through a network.

The recording control unit 105 is realized by, for example, a CPU, a ROM, a RAM, and the like. The recording control unit 105 associates the current position information output from the position detecting unit 101 and the time information output from the time detecting unit 103 with each other, and performs control of a process of recording these at a predetermined part of the memory unit 113 or the like, that is, a location history, to be described later as history information.

The recording control unit 105 associates and records the current position information and the time information, and thus, for example, the history information shown in FIG. 3 is stored in the memory unit 113 or the like. As shown in FIG. 3, the history information includes the current position information including the latitude and longitude representing the current position, and the time information including the corresponding time. The example shown in FIG. 3 is merely an example, and the history information may further associate information other than the shown information (for example, information such as user ID representing a user of the electronic apparatus, or information about the calendar such as weekdays and holidays).

The determination unit 107 is realized by, for example, a CPU, a ROM, a RAM, a communication device, and the like. The determination unit 107 determines a life zone, that is, a category, representing areas (regions) where a carrier (a user) of the electronic apparatus 10 ordinarily visits, i.e., visited locations, at least using the history information recorded in a predetermined storage place such as the memory unit 113.

Figure 4:
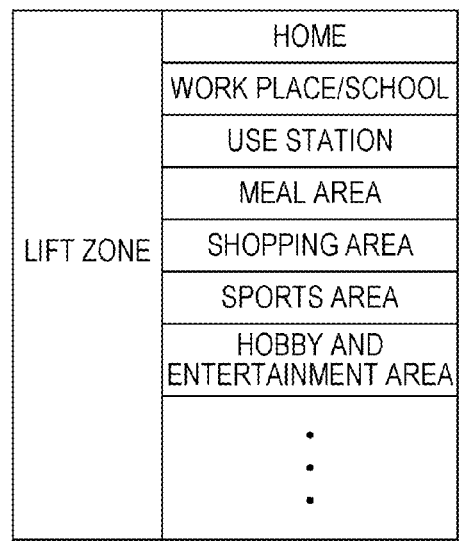
FIG. 4 is an explanatory diagram illustrating one example of a life zone according to the embodiment.

Kinds of life zones of the user determined by the determination unit 107 are not particularly limited, but, for example, items shown in FIG. 4 are determined as the life zone. The determination unit 107 may determine at least any one of life zones such as a home, a work place or a school, a station used, a meal area, a shopping area, a sports area, and a hobby and entertainment area.

The life zones corresponding to the items shown in FIG. 4, such as home, the work place or school, and the station used are not limited to one, and one or more areas are determined as the corresponding area for each item.

Figure 5:
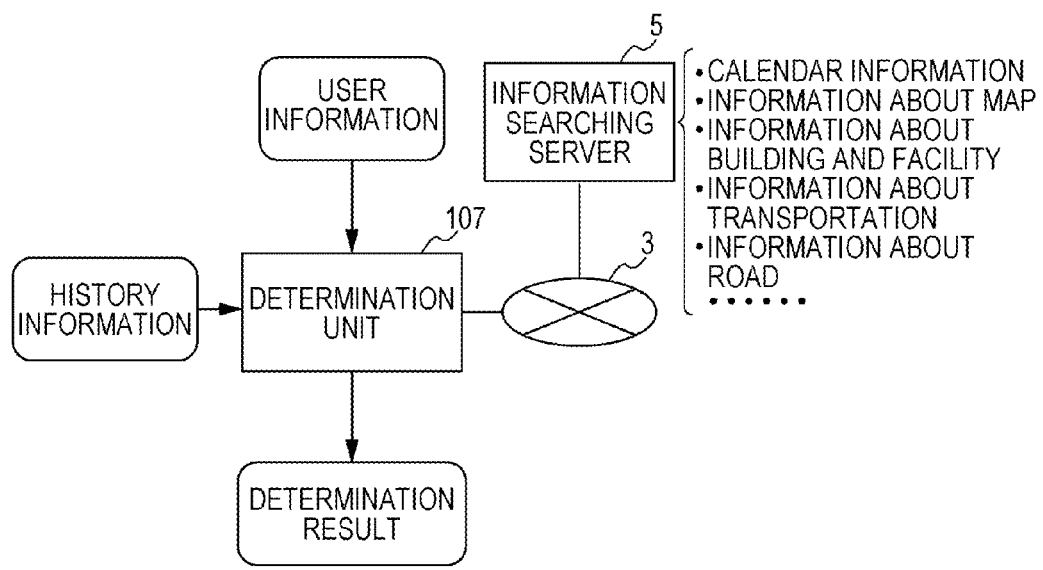
FIG. 5 is an explanatory diagram explaining a life zone determining process according to the embodiment.

For example, the determination unit 107 may perform the determination of the life zone of the user while using various kinds of information in addition to the history information stored in the memory unit 113 as shown in FIG. 5. For example, as shown in FIG. 5, the determination unit 107 may use personal information (user information) about personal users in addition to the history information. An example of the user information may be an address of the home, a zip code, a phone number, sex, date of birth, and the like of the user. The determination unit 107 may use various kinds of information acquired from various information searching servers 5 accessible through the network 3, for the determination of the life zone.

The network 3 is a communication line network communicably connecting the electronic apparatus 10 and the information searching server 5 to each other in two ways. The network is formed of, for example, a public line network such as the Internet, a phone line network, a satellite communication network, and a broadcasting network, a private line network such as a WAN (Wide Area Network), a LAN (Local Area Network), an IP-VPN (Internet Protocol-Virtual Private Network), Ethernet (registered trademark), and a wireless LAN, irrespective of a wire network or a wireless network.

The information searching server 5 provides various kinds of information about keywords by inputting the keyword related to what is wanted to be searched, and manages various kinds of information. An example of information acquired from the information searching server 5 may be information such as calendar information about weekdays and holidays, information about a map, information about buildings and facilities, information about transportation including a time schedule or a route, and information about a road. The information shown in FIG. 5 is merely an example, and the determination unit 107 may perform the determination of the line zone using various kinds of acquirable information.

The determination unit 107 may use various kinds of stored information with reference to various recording mediums such as a DVD disc and a Blu-ray disc storing, for example, map information, in addition to the information acquired from the various servers.

The determination process of the line zone of the user performed by the determination unit 107 is performed, for example, whenever a predetermined period is elapsed. The period may be preset in the electronic apparatus 10, and may be a value appropriately set by the user. However, as will be described later, since the life zone can be obtained by analyzing (for example, performing a statistics process) the history information, it is possible to perform more accurate determination as the number of data registered as the history information gets larger.

Accordingly, for example, when the life zone based on the activities of weekdays is determined, it is preferable to perform the determination process during a period of at least one week or more. As the determination process is performed during a period of one month or more, it is possible to determine the life zone based on the actions of holidays with high precision.

A specific example of the determination method of the life zone performed by the determination unit 107 will be described in detail later again.

Figure 6:
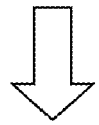
FIG. 6 is an explanatory diagram explaining a life zone determining process according to the embodiment.

For example, as shown in FIG. 6, the determination unit 107 may determine the life zone on the basis of the history information and the preset information. For example, as shown in FIG. 6, when a condition of "range of radius 3 km staying for 10 hours or more during one week" is set as the set information, the determination unit 107 may determine whether or not the position information is the life zone on the basis of the history information.

It is preferable that the determination unit 107 stores the information (for example, information representing the range of each life zone) about the obtained life zone in the storage unit 113 when the determination of the various life zones is completed. The determination unit 107 may output the obtained information about the life zone, that is, a category history (also referred to as life zone information) to the information selecting unit 109 to be described later. The determination unit 107 may output the obtained life zone information to various devices positioned on the outside of the electronic apparatus 10.

The determination unit 107 according to the embodiment automatically determines the life zone of the user, but the user may input information (for example, information representing the life zone or information representing that it is not the life zone) about the life zone of the user before the determination performed by the determination unit 107.

The determination unit 107 according to the embodiment may determine not only the life zone of the user but also determine whether or not the current position belongs to any one of the previously recognized life zones. In this case, the determination unit 107 determines whether or not the current position is included in several life zones with reference to the current position information and the life zone information included in the history information stored in the memory unit 113. The determination unit 107 may perform the determination with reference to the history information stored in the memory unit 113 or the like at an arbitrary timing (for example, with constant referencing, with referencing at each predetermined period, or the like).

The determination unit 107 may output the determination result of whether or not the current position belongs to the life zone to the information selecting unit 109 to be described later or may display the determination result on the display screen through the display control unit 111 to be described later. The determination unit 107 may output the determination result of whether or not the current position belongs to the life zone to the external device.

The information selecting unit 109 is realized by, for example, a CPU, a ROM, a RAM, a communication device, and the like. The information selecting unit 109 selects information provided for the carrier of the electronic apparatus 10 among the various kinds of information associated with the position information on the basis of the life zone information generated by the determination unit 107 and the preset setting information, that is, user input, about information selection. The information selecting unit 109 may further perform the selection on the basis of the preference or the like of the user when selecting information.

Figure 7:
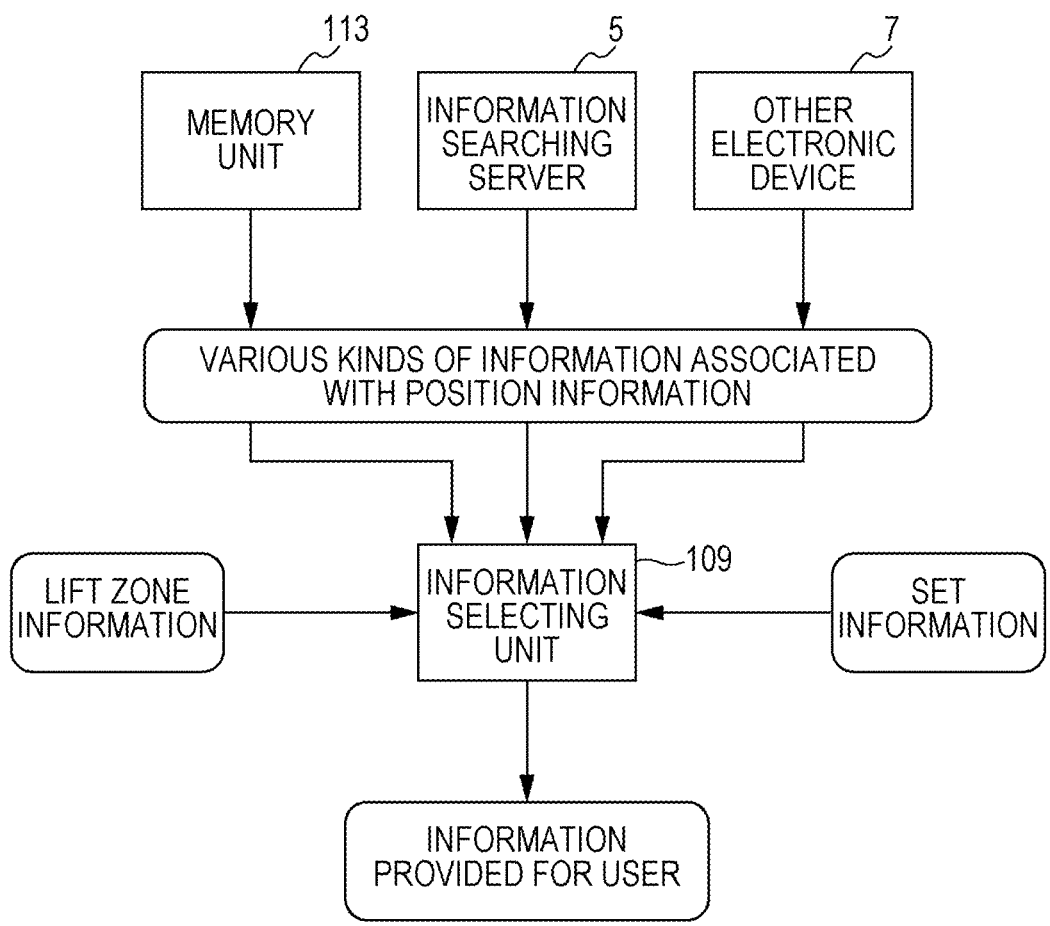
FIG. 7 is an explanatory diagram explaining an information selecting process according to the embodiment.

For example, as shown in FIG. 7, the information selecting unit 109 may select information provided for the user among the various kinds of information associated with the position information stored in the memory unit 113 of the electronic apparatus 10. For example, when various kinds of information corresponding to the preference of the user such as information about a favorite restaurant of the user are previously stored in the memory unit 113 or the like, the information selecting unit 109 may select information suitable for the set information of the various kinds of information.

The information selecting unit 109 may search the various kinds of information stored in the information searching server 5 or the other electronic apparatus 7 on the basis of the position information representing the position included in the life zone, to select information provided for the user among the obtained search results. For example, the information selecting unit 109 may search a site describing word-of-mouth information such as stores, or a store introduction site on the basis of the position information representing the position included in the life zone, to provide the information of the stores belonging to the life zone.

An example of the set information about information selection may be set such as the setting of "information of various events performed in facilities belonging to the life zone or the life zone is not provided" and the setting of "information of various events performed in facilities belonging to the life zone or the life zone is provided in detail". Such set information is previously registered, and thus the information selecting unit 109 may appropriately select the information according to the request of the user.

When the current position is located outside of the life zone, the information selecting unit 109 may perform matching of the information acquired from the information searching server 5 or the like using the preference information of the user or the various kinds of information in the life zone registered by the user. Accordingly, the information selecting unit 109 may appropriately select the information out of the life zone according to the preference of the user.

When the current position is located outside of the life zone, the information selecting unit 109 may perform information search by the information searching server 5 on the basis of the current position to provide the obtained information to the user. Accordingly, for example, when the user visits a place outside of the life zone such as when travelling, the user may use the electronic apparatus 10 as a travel guidebook.

The information selecting unit 109 may display the information selected as described above on a display unit such as a display of the electronic apparatus 10 through the display control unit 111 to be described later. The information selecting unit 109 may output the selected information to the external device.

The information selecting process described above is merely an example, and other various information selecting processes may be performed.

The display control unit 111 is realized by, for example, a CPU, a ROM, a RAM, and the like. The display control unit 111 performs control of the display screen displayed on the display device such as the display of the electronic apparatus 10 according to the embodiment. The display control unit 111 changes the contents displayed on the display screen according to at least any one of user operation information about the operation performed on the electronic apparatus 10 by the user, and various kinds of information output from the information selecting unit 109.

The memory unit 113 is an example of a storage device of the electronic apparatus 10 according to the embodiment. The history information generated by the recording control unit 105 and the life zone information generated by the determination unit 107 are stored in the memory unit 113. The user information about the user of the electronic apparatus 10, the user preference information representing the preference of the user, and the various kinds of information previously selected by the user may be recorded in the memory unit 113. Various parameters to be stored when the electronic apparatus 10 according to the embodiment performs any process, the progress of the process on the way, and the like, or various databases, programs, and the like are appropriately recorded in the memory unit 113 as necessary.

An example of the configuration of the electronic apparatus 10 according to the embodiment has been described above.

In the description, the case of providing the electronic apparatus 10 with the information selecting unit 109 has been described, but the electronic apparatus 10 may not be provided with the information selecting unit 109.

The electronic apparatus 10 according to the embodiment may be realized as a computer such as a personal computer and various servers, and may be realized as a mobile electronic apparatus such as a mobile music player, a mobile game machine, a mobile phone, a smart phone, a PDA, and a touch screen tablet. The electronic apparatus 10 according to the embodiment may be realized as a television and various recorders such as a DVD recorder and a Blu-Ray recorder, and may be realized as a car navigation system or the like.

An example of the functions of the electronic apparatus 10 according to the embodiment has been described above. The constituent elements may be configured using wide-use members or circuits, and may be configured by hardware specialized in the function of each constituent element. The CPU or the like may perform all the functions of the constituent elements. Accordingly, the used configuration may be appropriately modified according to the technical level when embodying the embodiment.

A computer program for realizing the functions of the electronic apparatus according to the embodiment described above may be produced and mounted on a personal computer or the like. In addition, a computer-readable recording medium storing such a computer program may be provided. The recording medium is, for example, a magnetic disk, an optical disc, an optical magnetic disc, a flash memory, or the like. The computer program may be transmitted through, for example, a network, without using the recording medium.

Specific Example of Life Zone Determining Method

Subsequently, the life zone determining method performed by the determination unit 107 according to the embodiment will be described in detail. The specific example described hereinafter is merely an example of the life zone determining method performed by the determination unit 107, and the life zone determining method performed by the determination unit 107 is not limited to the following example.

Example of Home Determination

Generally, it is considered that the user rests or sleeps at home during the night time band (particularly, a late night time band after 12 a.m.). The determination unit 107 may determine a place where the user does not move for a predetermined time or more during the night time band, as the home in the life zone of the user.

For example, the determination unit 107 may calculate the center of the position information described in the history information corresponding to the night time band, to determine the calculated center position as the home in the life zone of the user. The determination unit 107 may specify frequency distribution about the position using the position information described in the history information corresponding to the night time band, to determine the highest frequency position as the home in the life zone of the user.

Example of Work Place or School Determination

Generally, it is considered that the user works in the work place or school during the daytime band (particularly, the daytime band on weekdays). Accordingly, the determination unit 107 may determine a place where the user does not move for a predetermined number of days and for a predetermined time or more during the daytime (particularly, the daytime on weekdays), as the work place or school in the life zone of the user.

When the personal information of the user is stored in the memory unit 113 or the like, the determination unit 107 may substantially determine whether the facility located at the specific position is the work place or the school with consideration of the age of the user.

The determination unit 107 may perform an information search with the information searching server or the like using the specified position information (for example, information about latitude and longitude), to verify what exists at the specific position. For example, when the school is detected at the position with reference to the map information stored in the information searching server or the like, the determination unit 107 may determine the position as the school in the life zone of the user. Conversely, when the position is not a school, the position may be determined as the work place in the life zone of the user.

Example of Determination of Station Used

When the home and the work place or school of the user are specified, the determination unit 107 may determine a place where there is no change in position for a predetermined time or more when moving from the home to the work place or school, as a station used for commuting or going to school of the user. In this case, the station includes boarding locations for using transportation facilities such as a harbor for ships to come in and go out, an airport for using aircrafts, and a bus stop where buses stop, as well as a railroad station.

The determination unit 107 may perform information search with the information searching server or the like using the specified position information (for example, information about the latitude and longitude) to determine whether the specific position is a railroad station, a harbor, or a bus stop. When the position of the station used is specified, the determination unit 107 may search a time table of the corresponding transportation facilities with the information searching server or the like to specify a station name.

Example of Meal Area Determination

The determination unit 107 may determine a place where the user does not move for a predetermined time or more during the time band of having a breakfast, lunch, and dinner other than at home and the work place or school, as a meal area in the life zone of the user. Also in this case, the determination unit 107 may perform an information search using the specified position information to determine the meal area according to whether or not the position is a restaurant.

The time band of breakfast, lunch, and dinner may be set as an initial value, but the user may designate a time band based on the life pattern of the user.

Example of Sports Area Determination

The determination unit 107 may perform information search using the specified position information to determine a place which is a sports facility, a park, river bank, or the like, as a sports area in the life zone of the user.

Example of Shopping Area Determination

The determination unit 107 may determine a place corresponding to various stores or a place corresponding to a place where stores are crowded as a result of an information search based on the position information at a place where the user does not move on a predetermined date and for a predetermined time or more, or a place where the user does not move on a predetermined date of holidays and for a predetermined time or more in the course of moving from the place determined as the work place or school to the home, as a shopping area in the life zone of the user.

Example of Hobby and Entertainment Area Determination

The determination unit 107 may determine a place which does not correspond to the above-described areas at a place where the user does not move for a predetermined time or more on weekdays, or a place where the user does not move for a predetermined time or more on holidays, as a hobby and entertainment area in the life zone of the user.

A place which does not corresponding to the above-described areas and where the user frequently stays for a predetermined time or more may be determined as a new life zone by freely designating a name as the other life zones by the user.

The determination unit 107 determines a range within a predetermined distance from each area determined as the life zone, as each area, to designate the range of each area. In this case, the user may freely set the extent of the range of each area.

The user may freely set the predetermined period in the description. The setting method may be simply set such as several hours, and may be set as several hours per day, several hours per week, and several hours per month.

In the examples, the life pattern in which the user goes to the work place or school during the daytime, and comes back home during the night time is assumed, but a life pattern in which the user works during the night time and stays at home during the daytime is conceivable. The holiday is not limited to Sundays and national holiday, and may be freely set to determine the life zone.

An example of the life zone determining method performed by the determination unit 107 according to the embodiment has been described in detail.

Flow of Life Zone Determining Method

Next, a flow of the life zone determining method performed by the electronic apparatus 10 according to the embodiment will be described with reference to FIG. 8 to FIG. 12.

Overall Flow of Life Zone Determining Method

Figure 8:
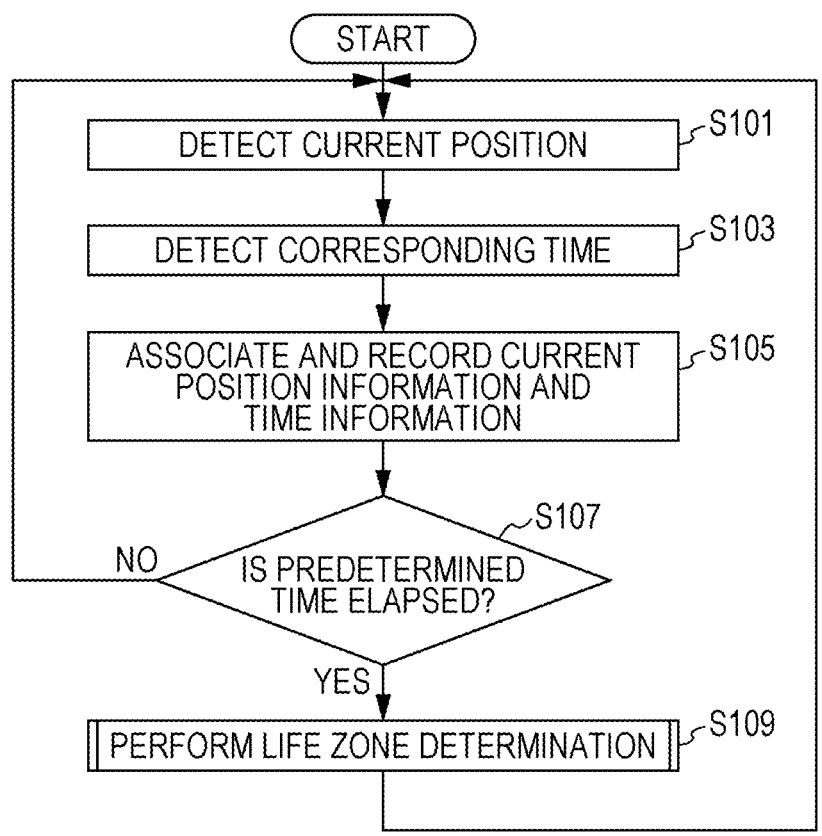
FIG. 8 is a flowchart illustrating an overall flow of a life zone determining process according to the embodiment.

First, an overall flow of the life zone determining method according to the embodiment will be briefly described with reference to FIG. 8. FIG. 8 is a flowchart illustrating an overall flow of the life zone determining method according to the embodiment.

First, the position detecting unit 101 of the electronic apparatus 10 detects the current position of the electronic apparatus 10 using the data acquired from the GPS, the base station, the access point, and the like (Step S101). When the position detecting unit 101 detects the current position, the position detecting unit 101 outputs the current position information representing the detected current position to the recording control unit 105.

The time detecting unit 103 of the electronic apparatus 10 detects the time corresponding to the current position (Step S103), and outputs the time information about the detection time to the recording control unit 105.

The recording control unit 105 associates the current position information output from the position detecting unit 101 and the time information output from the time detecting unit 103 with each other, and records them as the history information in the memory unit 113 or the like (Step S105).

The determination unit 107 of the electronic apparatus 10 determines whether or not a predetermined time is elapsed after the previous life zone determining process is performed (Step S107). When the predetermined time is not elapsed, the electronic apparatus 10 returns to Step S101 and continues the process.

Meanwhile, when the predetermined time is elapsed, the determination unit 107 performs the life zone determining process described above (Step S109). When the life zone determining process is completed, the determination unit 107 returns to Step S101 and waits until the timing of performing the next life zone determining process is reached.

First Home Determining Process

Figure 9:
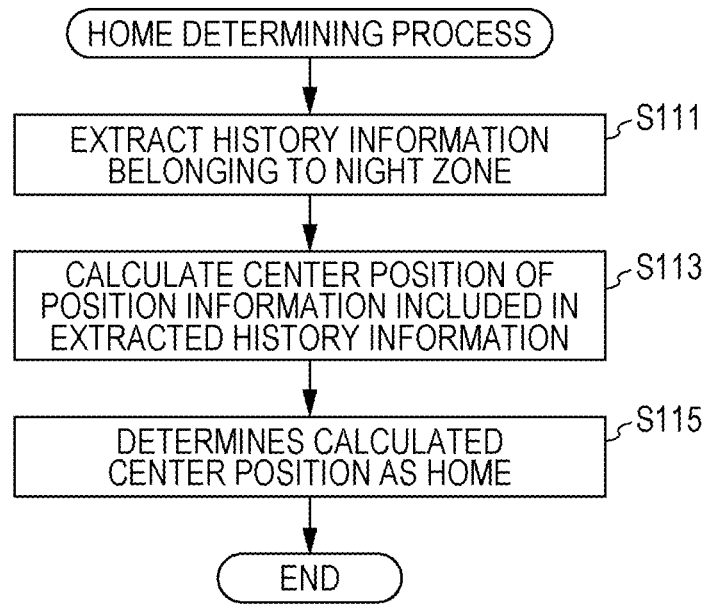
FIG. 9 is a flowchart illustrating an example of a flow of a home determining process according to the embodiment.

Next, flow of the home determining process performed by the determination unit 107 will be briefly described with reference to FIG. 9. FIG. 9 is a flowchart illustrating a flow of the home determining process performed by the determination unit 107 according to the embodiment.

First, the determination unit 107 extracts the history information belonging to the night time from the history information stored in the memory unit 113 or the like (Step S111). Then, the determination unit 107 acquires the position information included in the extracted history information, and calculates the center position of the obtained position information (Step S113). Thereafter, the determination unit 107 determines the calculated center position as the home of the user (Step S115).

Second Home Determining Process

Figure 10:
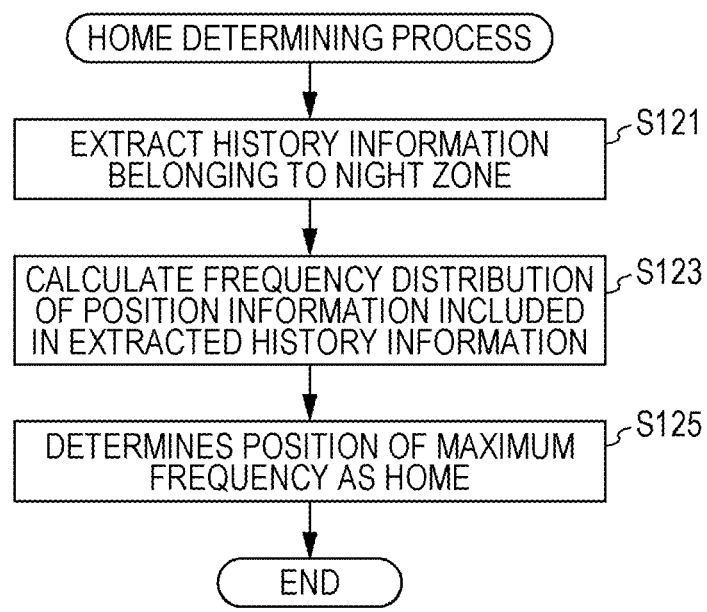
FIG. 10 is a flowchart illustrating an example of a flow of a home determining process according to the embodiment.

The determination unit 107 may determine the home position of the user as shown in the flow of FIG. 10. FIG. 10 is a flowchart illustrating a flow of the home determining process performed by the determination unit 107 according to the embodiment.

First, the determination unit 107 extracts the history information belonging to the night time from the history information stored in the memory unit 113 or the like (Step S121). Then, the determination unit 107 acquires the position information included in the extracted history information, and calculates frequency distribution of the position described in the position information (Step S123). Thereafter, the determination unit 107 determines the position of the highest frequency in the calculated frequency distribution as the home of the user (Step S125).

The determination unit 107 may determine the position of the home of the user from the history information by the method described above.

The work place or school determining process in the determination unit 107 may be specified by the same method as the method shown in FIG. 9 and FIG. 10 as described above, and thus the description thereof is omitted.

Determining Process for Station Used

Figure 11:
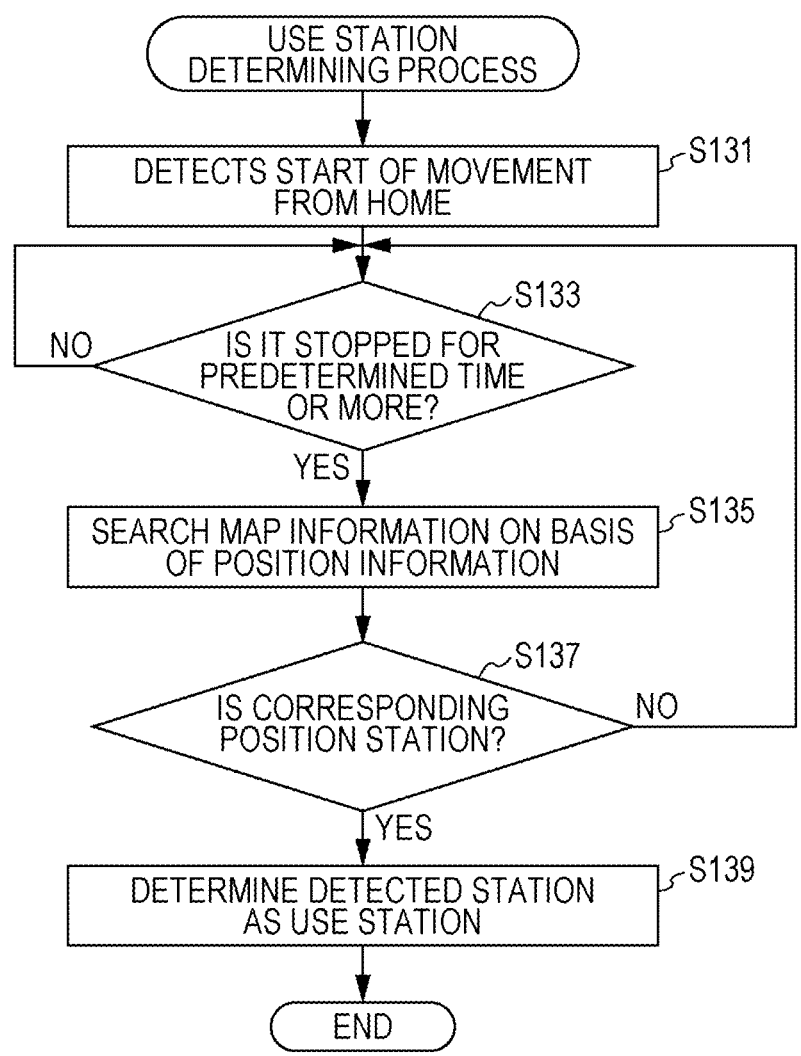
FIG. 11 is a flowchart illustrating an example of a flow of a determining process for the station used according to the embodiment.

Next, a flow of the determining process for the station used by the user performed by the determination unit 107 will be described with reference to FIG. 11. FIG. 11 is a flowchart illustrating a flow of the determining process for the station used performed by the determination unit 107 according to the embodiment.

Before the following description, it is assumed that the determination unit 107 detects that the user who is the carrier of the electronic apparatus 10 stays at home in the life zone of the user with reference to the history information stored in the memory unit 113 or the like. The determination unit 107 may detect the start of the movement of the user with reference to the history information stored in the memory unit 113 or the like at an arbitrary timing.

The determination unit 107 detects that the user starts moving from the home with reference to the current position information included in the history information stored in the memory unit 113 or the like (Step S131). The determination unit 107 detects the movement of the user and determines whether or not the user stops for a predetermined time or more with reference to the history information sequentially added by the movement of the user (Step S133).

When the user does not stop for the predetermined time or more, the determination unit 107 returns to Step S133 and continues the process. When the user stops for the predetermined time or more, the determination unit 107 searches the map information by the information searching server on the basis of the current position information representing the place where the user stops (Step S135).

The determination unit 107 determines whether or not the place where the user stops is the boarding place for using the transportation facilities such as a station using the search result (Step S137). When the place where the user stops is not the boarding place for using the transportation facilities such as the station, the determination unit 107 returns to Step S133 and continues the process. Meanwhile, when the place where the user stops is the boarding place for using the transportation facilities such as the station, the detected place is determined as the station used by the user (Step S139).

By performing such a process, the determination unit 107 may determine the station used in the life zone of the user using the history information and the information search results.

Meal Area Determining Process

Figure 12:
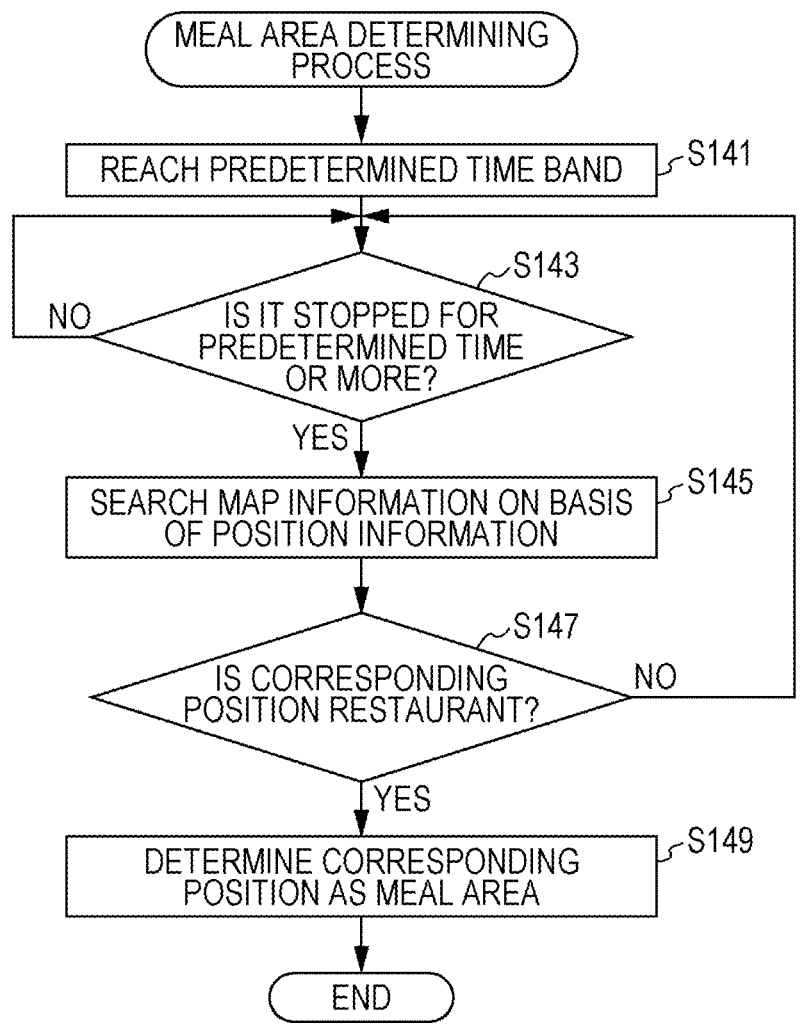
FIG. 12 is a flowchart illustrating an example of a flow of a meal area determining process according to the embodiment.

Next, a flow of the meal area determining process of the user performed by the determination unit 107 will be described with reference to FIG. 12. FIG. 12 is a flowchart illustrating a flow of the meal area determining process performed by the determination unit 107 according to the embodiment.

Before the following description, it is assumed that the time band capable of having a breakfast, lunch, and dinner is preset in the determination unit 107. The time band may be set by the user and may be preset.

The determination unit 107 detects that a predetermined time band likely to have a meal is reached on the basis of the information acquired from the clock function provided in the electronic apparatus 10, the GPS, the base station, the access point, or the like, or the information acquired from the various servers connected to the network (Step S141).

The determination unit 107 detects the movement of the user with reference to the history information sequentially added by the movement of the user, and determines whether or not the user stops for a predetermined time or more (Step S143).

When the user does not stop for the predetermined time or more, the determination unit 107 returns to Step S143 and continues the process. When the user stops for the predetermined time or more, the determination unit 107 searches the map information by the information searching server on the basis of the current position information representing the place where the user stops (Step S145).

The determination unit 107 determines whether or not the place where the user stops is a restaurant using the search result (Step S147). When the place where the user stops is not the restaurant, the determination unit 107 returns to Step S143 and continues the process. Meanwhile, if the place where the user stops is the restaurant, the detected place is determined as the meal area in the life zone of the user (Step S149).

By performing such a process, the determination unit 107 may determine the meal area in the life zone of the user using the history information and the information search results.

The flow of the determination process of the sports area, the shopping area, and the hobby and entertainment area is substantially the same as the case shown in FIG. 12, and thus the description thereof is omitted hereinafter.

Flow of Information Selecting Method

Figure 13:
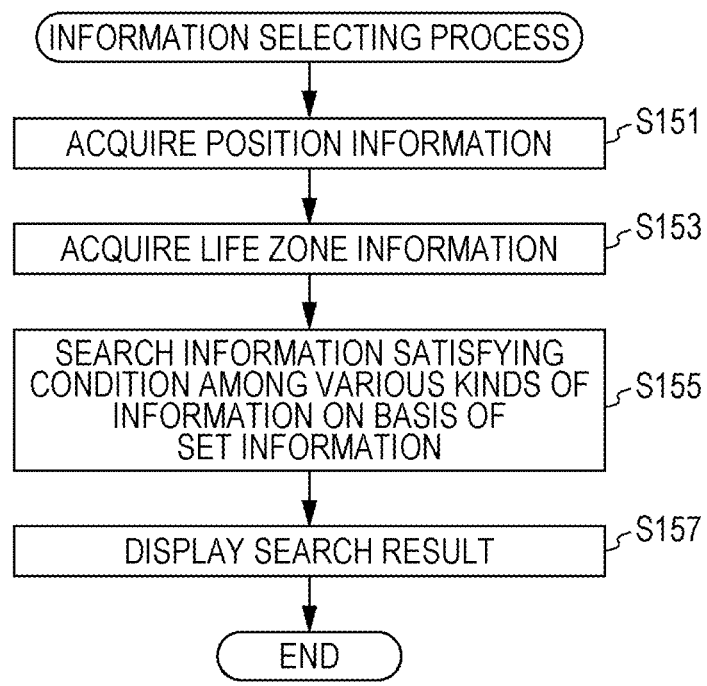
FIG. 13 is a flowchart illustrating an example of a flow of an information selecting process according to the embodiment.

Next, a flow of the information selecting method performed by the electronic apparatus 10 according to the embodiment will be briefly described with reference to FIG. 13. FIG. 13 is a flowchart illustrating a flow of the information selecting method performed by the information selecting unit 109 according to the embodiment.

The information selecting unit 109 acquires the position information about the current position of the electronic apparatus 10 from at least either one of the position detecting unit 101 and the memory unit 113 (Step S151), and acquires the life zone information stored in the memory unit 113 or the like (Step S153).

Then, the information selecting unit 109 searches information satisfying the condition from the information (the information associated with the position information) acquired from the memory unit 113, the information searching server, and the other electronic apparatus on the basis of the set information about information selection (Step S155). Accordingly, the information selecting unit 109 selects the details of the information belonging to the life zone, or, on the other hand, does not select the information belonging to the life zone, thereby selecting the information requested by the user.

The information selecting unit 109 displays the information obtained from the search result on the display device such as the display through the display control unit 111 (Step S157). Accordingly, the user may detect the information selected by the information selecting unit 109.

The electronic apparatus 10 and the life zone determining method according to the first embodiment have been described above in detail.

Second Embodiment

In the electronic apparatus 10 according to the first embodiment of the disclosure described above, the electronic apparatus 10 acquires the current position information and the time information and determines the life zone of the user by itself. The second embodiment described hereinafter relates to a system in which the life zone of the user is determined with cooperation between the electronic apparatus 10 acquiring the current position information and the information determining server 20 determining the life zone of the user using the current position information.

Configuration of Electronic Apparatus

Figure 14:
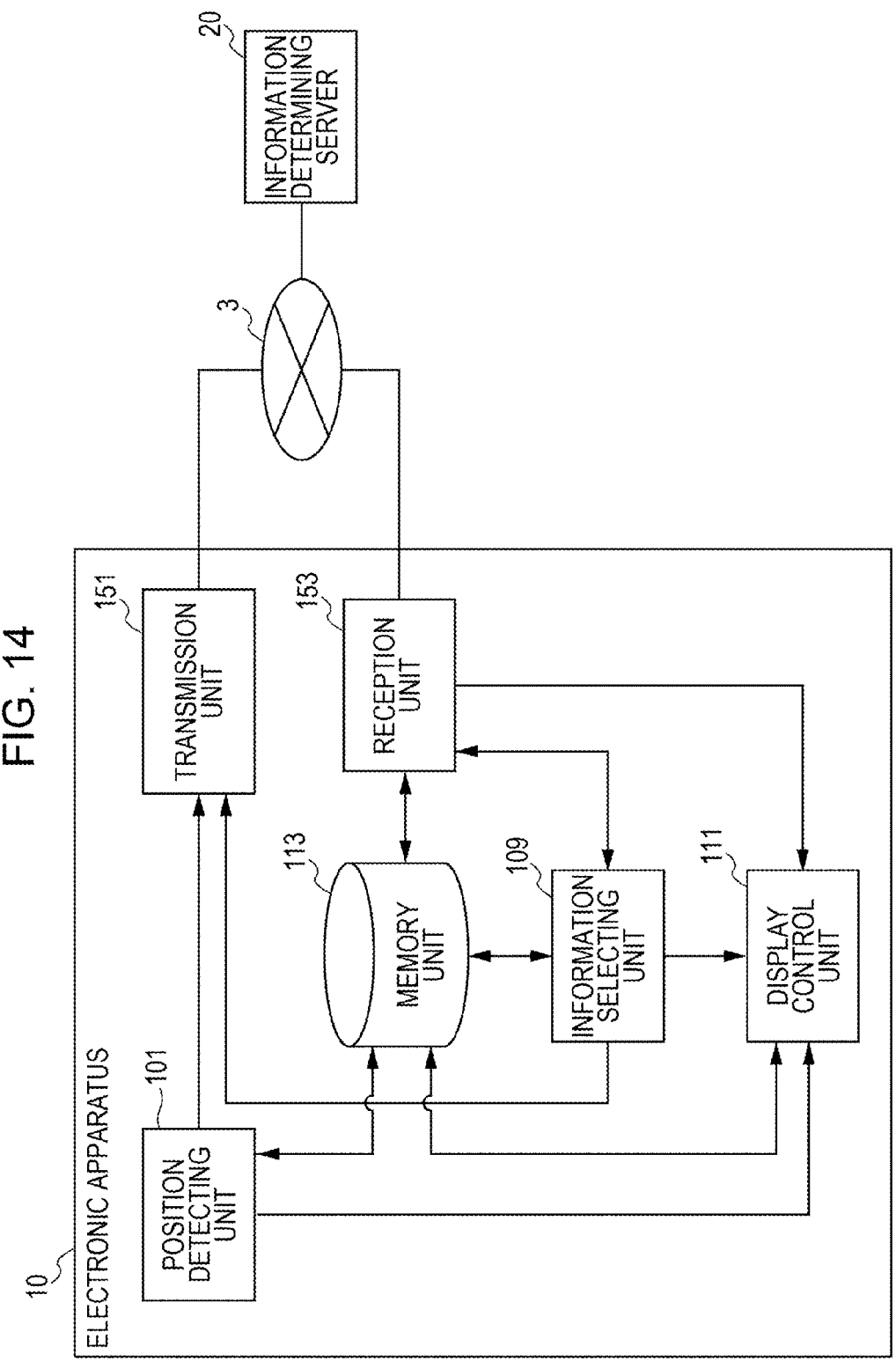
FIG. 14 is a block diagram illustrating a configuration of an electronic apparatus according to a second embodiment of the present disclosure.

First, the configuration of the electronic apparatus 10 according to the embodiment will be described with reference to FIG. 14. FIG. 14 is a block diagram illustrating the configuration of the electronic apparatus 10 according to the embodiment.

As shown in FIG. 14, the electronic apparatus 10 according to the embodiment mainly includes a position detecting unit 101, an information selecting unit 109, a display control unit 111, a memory unit 113, a transmission unit 151, and a reception unit 153.

In the embodiment, the position detecting unit 101, the display control unit 111, and the memory unit 113 according to the embodiment have the same configuration as that of each processing unit according to the first embodiment to cause the same effect. Accordingly, the detailed description thereof is omitted hereinafter.

The information selecting unit 109 according to the embodiment uses the life zone information acquired from the information determining server 20 by the reception unit 153 to be described later when selecting information provided for the user. The information selecting unit 109 according to the embodiment may determine whether or not the current position is included in the previously registered life zone with reference to the acquired life zone information and the current position information included in the history information stored in the memory unit 113 or the like. The information selecting unit 109 may output the determination result of whether or not the current position is included in the life zone to the display device such as the display of the electronic apparatus 10 through the display control unit 111.

The information selecting unit 109 according to the embodiment may provide the information provided for the user and transmitted from the information determining server 20 to be described later, for the user without performing the further selection process.

The information selecting unit 109 according to the embodiment has the same configuration as that of the information selecting unit 109 according to the first embodiment to cause the same effect, other than the above-described function. Accordingly, the detailed description thereof is omitted hereinafter.

The transmission unit 151 is realized by, for example, a CPU, a ROM, a RAM, a communication device, and the like. The transmission unit 151 transmits the information (the current position information) about the current position detected by the position detecting unit 101 to the information determining server 20 to be described later through the network 3.

As will be described hereinafter, in the information determining system according to the embodiment, the life zone of the user is determined by the information determining server 20 connected to the network 3. The transmission unit 151 associates the transmitted current position information with identification information (for example, user ID and the like) unique to the user, such that the information determining server 20 can detect clearly to whom the current position information relates.

The transmission unit 151 may transmit the current position information whenever the new current position is reported by the position detecting unit 101, but it is preferable to transmit the current position information when the current position is changed. When the current position information is transmitted whenever the new current position is reported, resources necessary for transmission of the current position information become large, but when the current position information is transmitted when the current position is changed, it is possible to reduce the resources necessary for transmission of the current position information.

The reception unit 153 is realized by, for example, a CPU, a ROM, a RAM, a communication device, and the like. The reception unit 153 receives the life zone information of the carrier (user) of the electronic apparatus 10 transmitted from the information determining server 20 to be described later. When the reception unit 153 receives the life zone information of the user, the reception unit 153 records the acquired life zone information in the memory unit 113. The reception unit 153 may directly output the acquired life zone information to the information selecting unit 109.

The electronic apparatus 10 according to the embodiment may be realized as a computer such as a personal computer or various servers, and may be realized as a mobile electronic apparatus such as a mobile music player, a mobile game console, a mobile phone, a smart phone, a PDA, and a touch screen tablet. The electronic apparatus 10 according to the embodiment may be realized as a television and various recorders such as a DVD recorder and a Blu-Ray recorder, and may be realized as a car navigation system or the like.

An example of the functions of the electronic apparatus 10 according to the embodiment has been described above. The constituent elements may be configured using generic members or circuits, and may be configured by hardware specialized in the function of each constituent element. The CPU or the like may perform all the functions of the constituent elements. Accordingly, the used configuration may be appropriately modified according to the technical level when embodying the embodiment.

A computer program for realizing the functions of the electronic apparatus according to the embodiment described above may be produced and mounted on a personal computer or the like. In addition, a computer-readable recording medium storing such a computer program may be provided. The recording medium is, for example, a magnetic disk, an optical disc, an optical magnetic disc, a flash memory, or the like. The computer program may be transmitted through, for example, a network, without using the recording medium.

Configuration of Information Determining Server

Figure 15:
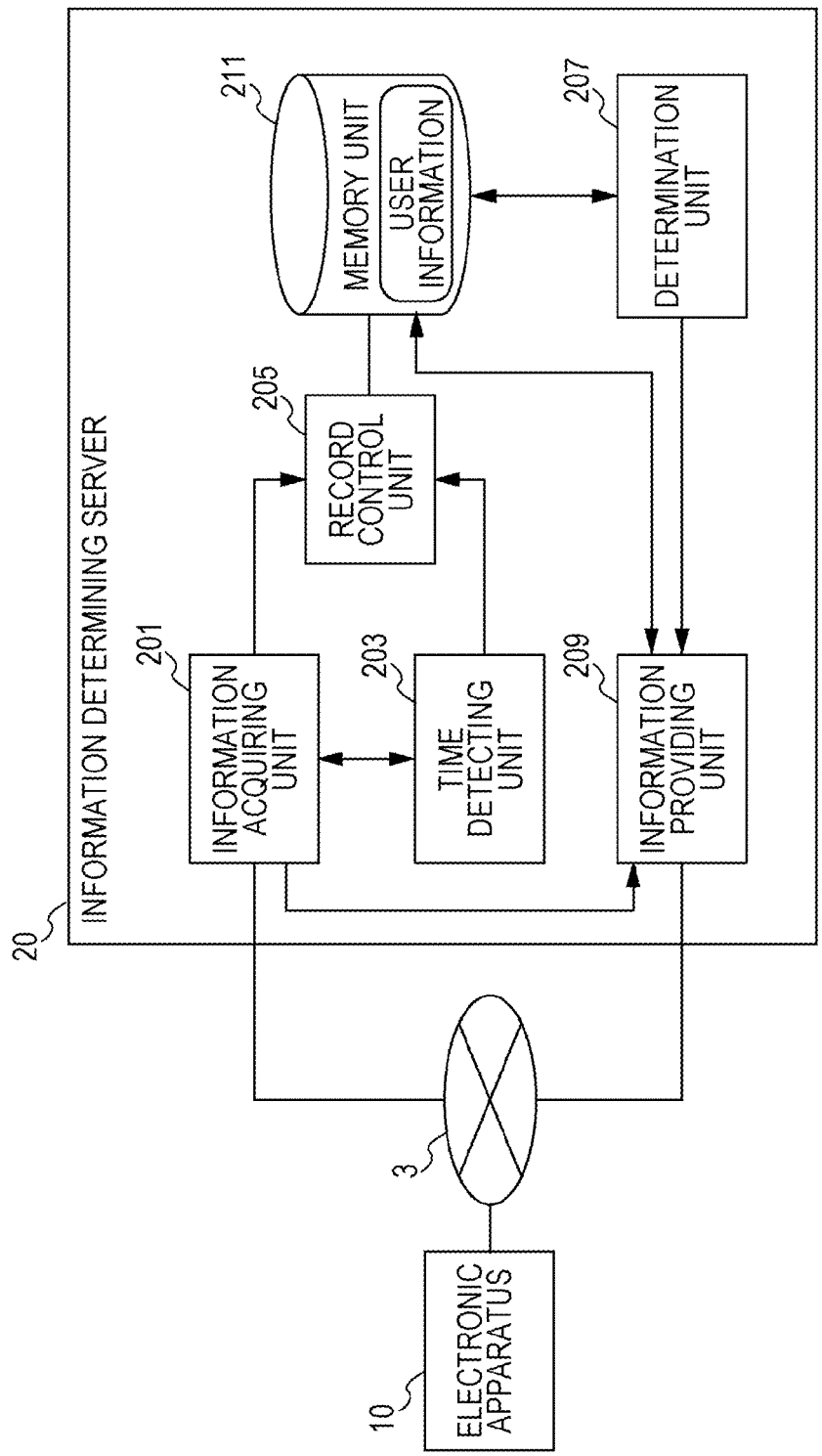
FIG. 15 is a block diagram illustrating a configuration of an information determining server according to the embodiment.

Subsequently, the configuration of the information determining server 20 according to the embodiment will be described with reference to FIG. 15. FIG. 15 is a block diagram illustrating the configuration of the information determining server 20 according to the embodiment.

As shown in FIG. 15, the information determining server 20 according to the embodiment mainly includes an information acquiring unit 201, a time detecting unit 203, a recording control unit 205, a determination unit 207, an information providing unit 209, and a memory unit 211.

The time detecting unit 203, the recording control unit 205, and the determination unit 207 have the same configurations as those of the time detecting unit 103, the recording control unit 105, and the determination unit 107 of the electronic apparatus 10 according to the first embodiment to cause the same effect. For this reason, the detailed description thereof is omitted hereinafter.

The information acquiring unit 201 is realized by, for example, a CPU, a ROM, a RAM, a communication device, and the like. The information acquiring unit 201 acquires the current position information transmitted from the electronic apparatus 10 through the network 3, and outputs the current position information to the memory control unit 205 to be described later. The current position information transmitted from the electronic apparatus 10 may be associated with identification information (for example, user ID) unique for the user. For this reason, the information determining server 20 acquiring the current position information may easily determine to whom the current position information is related.

The information providing unit 209 is realized by, for example, a CPU, a ROM, a RAM, and a communication device. The information providing unit 209 provides the life zone information about the life zone of the user of the electronic apparatus 10 determined by the determination unit 207, for the corresponding electronic apparatus 10.

The information providing unit 209 performs selection of the information (various kinds of information associated with the position information) provided for the user on the basis of the life zone information of the user and the history information of the user, and provides the information to the corresponding electronic apparatus 10. In other words, the information providing unit 209 according to the embodiment also has the function of the information selecting unit 109 of the electronic apparatus 10 according to the first embodiment.

The memory unit 211 is an example of a storage device of the information determining server 20 according to the embodiment. The history information generated by the recording control unit 205 and the life zone information generated by the determination unit 207 are associated and stored for each user in the memory unit 211. The user information about the user of the electronic apparatus 10, the user preference information representing the preference of the user, and the various kinds of information previously selected by the user may be recorded in the memory unit 211. Various parameters to be stored when the information determining server 20 according to the embodiment performs any process, the progress of the process, and the like, or various databases, programs, and the like are appropriately recorded in the memory unit 211.

All the information about the user of the electronic apparatus 10 may be stored in the memory unit 211, and it is preferable that the personal information of the user is not stored from the viewpoint of personal information protection. Since the personal information of the user is not stored, the information determining server 20 may output candidate information to the electronic apparatus 10 and may be subjected to attribution of the life zone information by the user of the electronic apparatus 10 when there is life zone information that is difficult to determine.

The user information including the life zone information or the history information is stored for each user in the memory unit 211. For this reason, the determination unit 207 according to the embodiment may determine the user storing the life zone information about the life zone information about the same home, the work place or school, for example, as family, a co-worker at the work place, and a schoolmate at the school, with reference to the user information.

An example of the functions of the information determining server 20 according to the embodiment has been described above. The constituent elements may be configured using generic members or circuits, and may be configured by hardware specialized in the function of each constituent element. The CPU or the like may perform all the functions of the constituent elements. Accordingly, the used configuration may be appropriately modified according to the technical level when embodying the embodiment.

A computer program for realizing the functions of the information determining server according to the embodiment described above may be produced and mounted on a personal computer or the like. In addition, a computer-readable recording medium storing such a computer program may be provided. The recording medium is, for example, a magnetic disk, an optical disc, an optical magnetic disc, a flash memory, or the like. The computer program may be transmitted through, for example, a network, without using the recording medium.

Flow of Life Zone Determining Method

Figure 16:
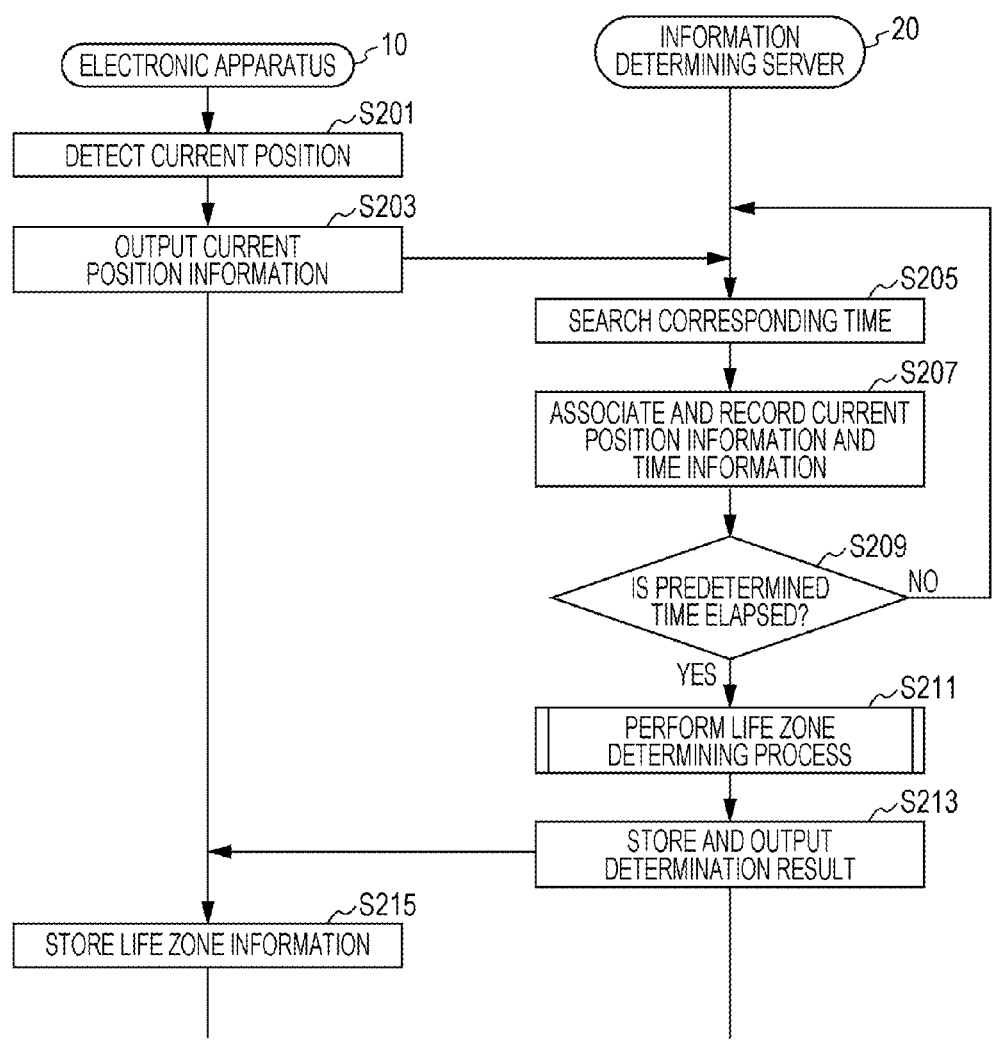
FIG. 16 is a flowchart illustrating an example of a flow of a life zone determining process according to the embodiment.

Next, an overall flow of the life zone determining method performed by the information determining server 20 according to the embodiment will be described with reference to FIG. 16. FIG. 16 is a flowchart illustrating an overall flow of the life zone determining method according to the embodiment.

The flow of the individual life zone determining process performed by the information determining server 20 is the same as the flow of the life zone determining process performed by the electronic apparatus 10 according to the first embodiment, and thus the detailed description thereof is omitted hereinafter.

First, the position detecting unit 101 of the electronic apparatus 10 detects the current position of the electronic apparatus 10 using the data acquired from the GPS, the base station, the access point, and the like (Step S201). When the position detecting unit 101 detects the current position, the position detecting unit 101 outputs the current position information representing the detected current position to the transmission unit 151.

The transmission unit 151 outputs the current position information output from the position detecting unit 101 to the information determining server 20 through the network 3 when the current position of the electronic apparatus 10 is changed with reference to the current position information output from the position detecting unit 101 (Step S203). In this case, the transmission unit 151 associates the identification information (for example, user ID and the like) of the user storing the electronic apparatus 10 with the transmitted current position information.

When the information acquiring unit 201 of the information determining server 20 acquires the current position information transmitted from the electronic apparatus 10, the information acquiring unit 201 outputs the acquired current position information to the recording control unit 205. The time detecting unit 203 detects the time corresponding to the acquired current position information (Step S205), and outputs the time information about the detection time to the recording control unit 205.

The recording control unit 205 of the information determining server 20 associates the current position information output from the information acquiring unit 201 and the time information output from the time detecting unit 203 with each other, and records them in the memory unit 211 or the like as the history information (Step S207). In this case, the recording control unit 205 rewrites the acquired new history information to the history information of the corresponding user with reference to the identification information of the user associated with the current position information.

The determination unit 207 of the information determining server 20 determines whether or not a predetermined time is elapsed after the previous life zone determining process is performed (Step S209). When the predetermined time is not elapsed, the information determining server 20 returns to Step S205 and continues the process.

Meanwhile, when the predetermined time is elapsed, the determination unit 207 performs the life zone determining process described above (Step S211). When the life zone determining process is completed, the determination unit 207 associates the determination result with the user information of the corresponding user and stores it in the memory unit 211 or the like (Step S213). The determination unit 207 outputs the life zone information obtained from the determination result, to the information providing unit 209. The information providing unit 209 outputs the life zone information obtained from the determination result to the corresponding electronic apparatus 10 (Step S213).

When the reception unit 153 of the electronic apparatus 10 acquires the life zone information transmitted from the information determining server 20, the reception unit 153 stores the acquired life zone information in the memory unit 113 or the like (Step S215). Accordingly, the electronic apparatus 10 may acquire the information about the life zone of the user.

Flow of Information Selecting Method

Figure 17:
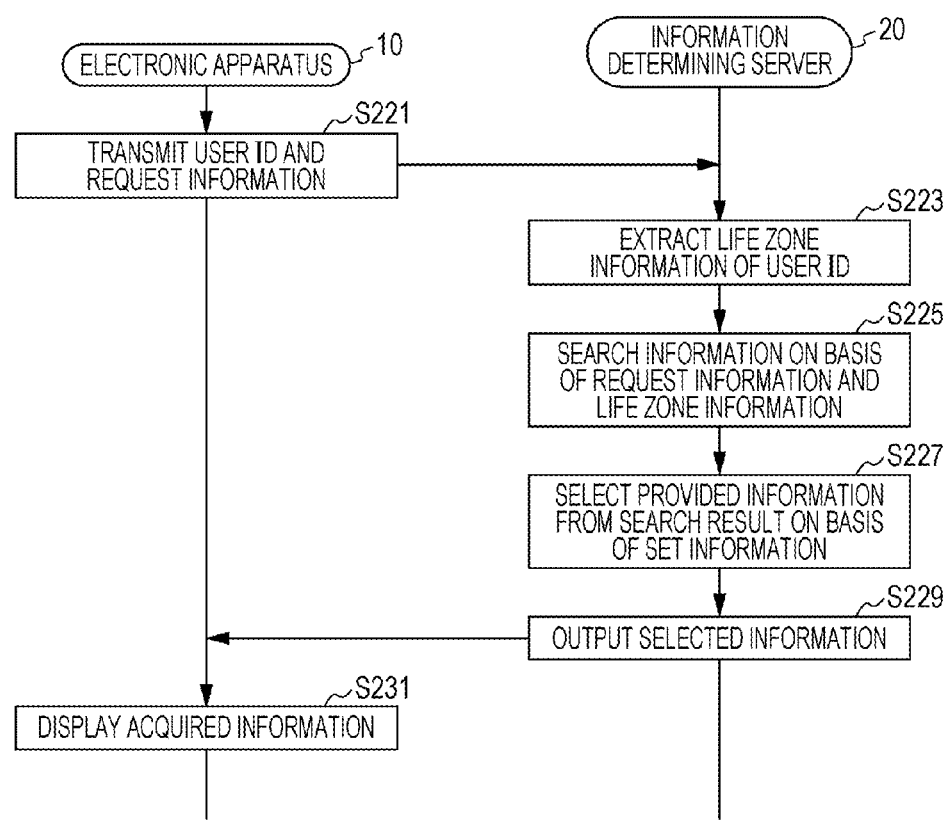
FIG. 17 is a flowchart illustrating an example of a flow of an information selecting process according to the embodiment.
Figure 18:
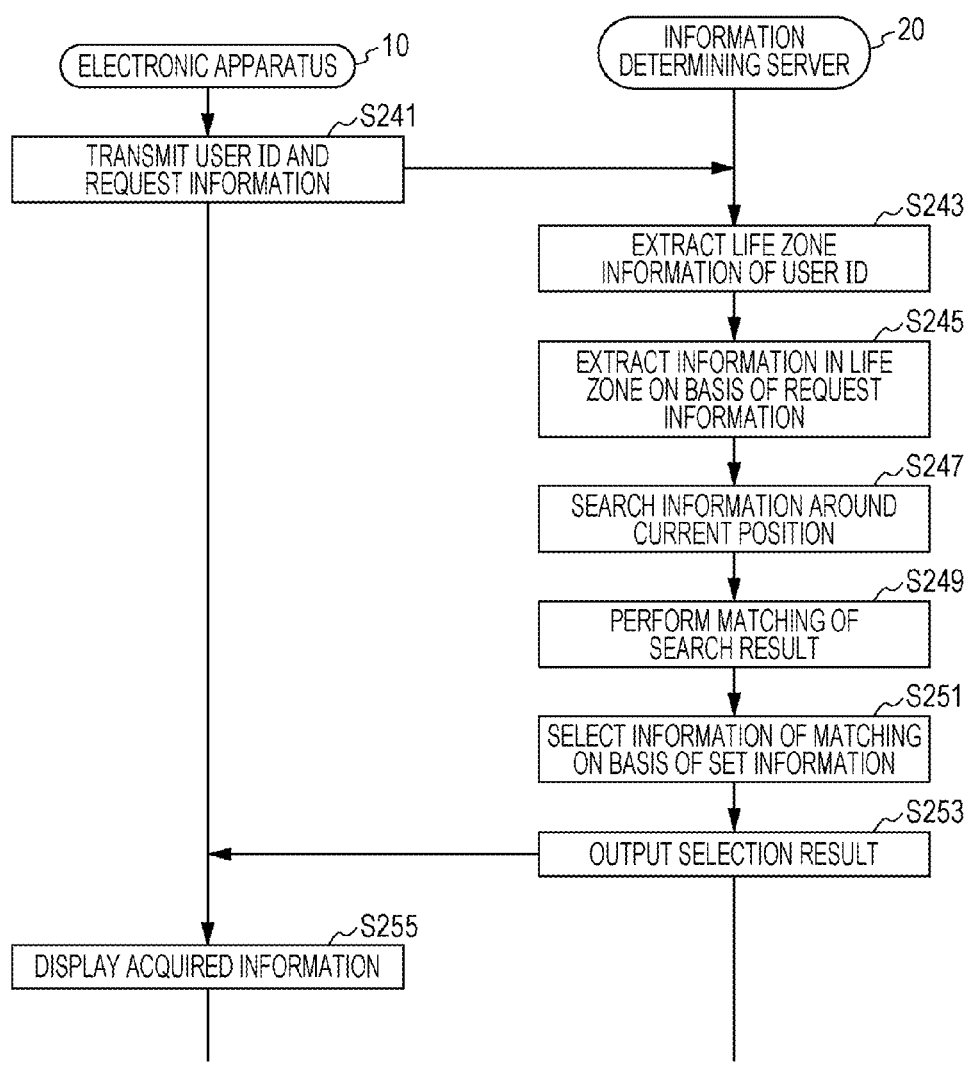
FIG. 18 is a flowchart illustrating an example of a flow of an information selecting process according to the embodiment.

Next, a flow of the information selecting method performed by the information determining system including the electronic apparatus 10 and the information determining server 20 according to the embodiment will be briefly described with reference to FIG. 17 and FIG. 18. FIG. 17 and FIG. 18 are flowcharts illustrating a flow of the information selecting method performed by the information determining system according to the embodiment.

First, the information selecting unit 109 of the electronic apparatus 10 associates the user ID and request information representing what information is desired to be acquired with each other through the transmission unit 151, and transmits them to the information determining server 20 (Step S221).

It is preferable that the request information includes the current position information about the current position of the user.

When the information acquiring unit 201 of the information determining server 20 acquires the user ID and the request information transmitted from the electronic apparatus 10, the information acquiring unit 201 outputs the acquired information to the information providing unit 209. When the information providing unit 209 acquires the information, the information providing unit 209 extracts the life zone information of the corresponding user from a predetermined part such as the memory unit 211 with reference to the acquired user ID (Step S223).

Then, the information providing unit 209 searches the various kinds of information provided for the user on the basis of the acquired request information and the life zone information (Step S225). Then, the information providing unit 209 selects the information provided for the electronic apparatus 10 from the search result on the basis of the set information representing what information is desired to be acquired, which is described in the request information (Step S227). Thereafter, the information providing unit 209 outputs the selected information to the electronic apparatus 10 transmitting the request information (Step S229).

When the reception unit 153 of the electronic apparatus 10 acquires the information transmitted from the information determining server 20, the reception unit 153 outputs the acquired information to the information selecting unit 109. When the information selecting unit 109 acquires the information output from the information determining server 20, the information selecting unit 109 displays the acquired information through the display control unit 111 (Step S231). Accordingly, the user of the electronic apparatus 10 may grasp the various kinds of selected information on the basis of the life zone information.

In the information determining system according to the embodiment, as shown in the flow of FIG. 18, when the user is located outside of the range of the life zone of the user, the information based on the preference of the user may be provided. The fact that the user is located outside of the range of the life zone of the user by itself assumes that an irregular situation different from the ordinary life pattern of the user occurs. In the information determining system according to the embodiment, even in the case of the information about the outside of the range of the life zone, the information matching is achieved using the life zone information, and thus the information based on the preference of the user may be provided for the user.

First, the information selecting unit 109 of the electronic apparatus 10 associates the user ID and request information representing what information is desired to be acquired with each other through the transmission unit 151, and transmits them to the information determining server 20 (Step S241). It is preferable that the request information includes the current position information about the current position of the user.

When the information acquiring unit 201 of the information determining server 20 acquires the user ID and the request information transmitted from the electronic apparatus 10, the information acquiring unit 201 outputs the acquired information to the information providing unit 209. When the information providing unit 209 acquires the information, the information providing unit 209 extracts the life zone information of the corresponding user from a predetermined part such as the memory unit 211 with reference to the acquired user ID (Step S243).

Then, the information providing unit 209 searches the various kinds of information in the life zone on the basis of the acquired request information and the life zone information (Step S245). Then, the information providing unit 209 searches current position circumstance information that is the candidate of the information provided for the user using at least the current position information (Step S247).

Subsequently, the information providing unit 209 performs matching between the various kinds of information in the life zone and the various kinds of information of the current position circumstance (Step S249). Accordingly, the information based on the preference of the user may be extracted from the various kinds of current position circumstance information. Thereafter, the information providing unit 209 selects the information provided for the electronic apparatus 10 from the extracted result, on the basis of the set information representing what information is desired to be acquired, which is described in the request information, or the like (Step S251). Thereafter, the information providing unit 209 outputs the selected information to the electronic apparatus 10 transmitting the request information (Step S253).

When the reception unit 153 of the electronic apparatus 10 acquires the information transmitted from the information determining server 20, the reception unit 153 outputs the acquired information to the information selecting unit 109. When the information selecting unit 109 acquires the information output from the information determining server 20, the information selecting unit 109 displays the acquired information through the display control unit 111 (Step S255). Accordingly, the user of the electronic apparatus 10 may acquire the various kinds of selected information on the basis of the life zone information even when the user is located outside of the range of the life zone.

The flow of the information selecting method according to the embodiment has been briefly described above with reference to FIG. 17 and FIG. 18.

Hardware Configuration

Figure 19:
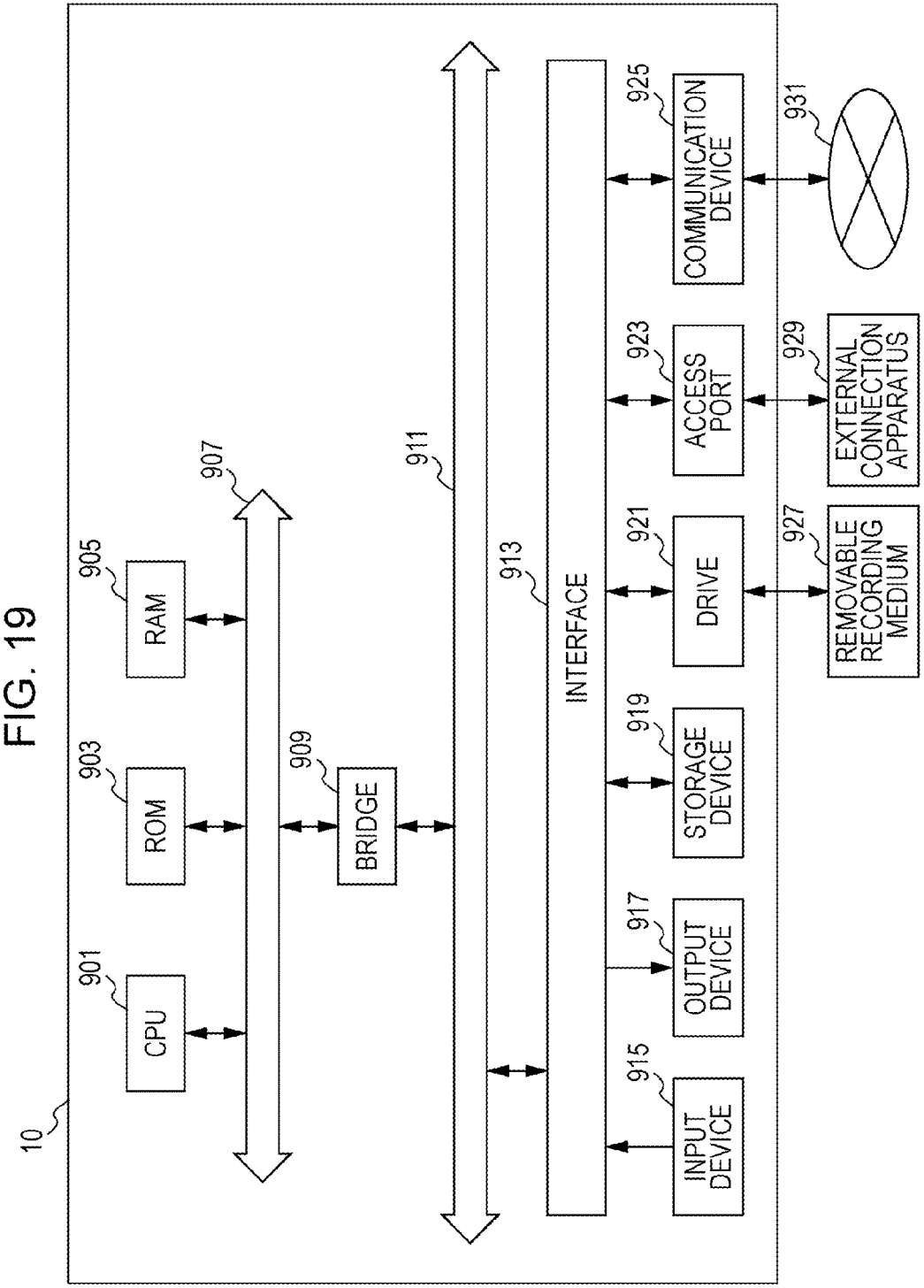
FIG. 19 is a block diagram illustrating a hardware configuration of an electronic apparatus according to an embodiment of the disclosure.

Next, the hardware configuration of the electronic apparatus 10 according to the embodiment will be described in detail with reference to FIG. 19. FIG. 19 is a block diagram illustrating the hardware configuration of the electronic apparatus 10 according to the embodiment of the disclosure.

The electronic apparatus 10 mainly includes a CPU 901, a ROM 903, and a RAM 905. The electronic apparatus 10 further includes a host bus 907, a bridge 909, an external bus 911, an interface 913, an input device 915, an output device 917, a storage device 919, a drive 921, an access port 923, and a communication device 925.

The CPU 901 functions as an operation processing device and a control device to control the whole or a part of the operation in the electronic apparatus 10 according to various programs recorded in the ROM 903, the RAM 905, the storage device 919, or a removable recording medium 927. The ROM 903 stores programs and operation parameters used by the CPU 901. The RAM 905 primarily stores programs used by the CPU 901 or parameters appropriately changed according to the execution of the programs. These are connected to each other by the host bus 907 formed of an internal bus such as a CPU bus.

The host bus 907 is connected to the external bus 911 such as a PCI (Peripheral Component Interconnect/Interface) bus through the bridge 909.

The input device 915 is an operator operated by the user, such as a mouse, a keyboard, a touch panel, a button, a switch, and a lever. The input device 915 may be, for example, remote control device (so-called remote controller)

using an infrared ray or other electronic waves, and may be an external connection device 929 such as a mobile phone or a PDA corresponding to the operation of the electronic apparatus 10. For example, the input device 915 is formed of an input control circuit of generating an input signal on the basis of information input by the user using the operator and outputting the signal to the CPU 901. The user of the electronic apparatus 10 may input various kinds of data and instruct a process operation to the electronic apparatus 10 by operating the input device 915.

The output device 917 is formed of a device capable of visually and auditorily notifying the user of the acquired information. As such a device, there are a display device such as a CRT display device, a liquid crystal display device, a plasma display device, an EL display device, and a lamp, an audio output device such as a speaker and a headphone, a printer device, a mobile phone, a facsimile, and the like. The output device 917 outputs the result obtained by the various processes of the electronic apparatus 10. Specifically, the display device displays the result obtained by the various processes of the electronic apparatus 10 by text or an image. Meanwhile, the audio output device converts an audio signal formed of produced audio data, sound data, or the like into an analog signal, and outputs the audio signal.

The storage device 919 is a device for storing data configured as an example of the memory unit of the electronic apparatus 10. The storage device 919 is formed of, for example, a magnetic memory device such as an HDD (Hard Disk Drive), a semiconductor memory device, an optical memory device, an optical magnetic memory device, or the like. The storage device 919 stores programs and various kinds of data performed by the CPU 901, and various kinds of data acquired from the outside.

The drive 921 is a recording medium reader/writer, and is built in to the electronic apparatus 10 or attached to the outside. The drive 921 reads information recorded in the removable recording medium 927 such as the magnetic disk, the optical disc, the optical magnetic disc, and the semiconductor memory which are mounted thereon, and outputs the information to the RAM 905. The drive 921 may perform writing of recording on the removable recording medium 927 such as the magnetic disk, the optical disc, the optical magnetic disc, and the semiconductor memory which are mounted thereon. The removable recording medium 927 is, for example, DVD media, HD-DVD media, and Blu-ray media. The removable recording medium 927 may be a Compact Flash (registered trademark) (Compact Flash: CF), a flash memory, an SD memory card (Secure Digital memory card), or the like. The removable recording medium 927 may be, for example, an IC card (Integrated Circuit card) having a non-contact type IC chip mounted thereon, or an electronic apparatus.

The access port 923 is a port for directly connecting a device to the electronic apparatus 10. As examples of the access port 923, there are a USB (Universal Serial Bus) port, an IEEE1394 port, an SCSI (Small Computer System Interface) port, and the like. As other examples of the access port 923, there are an RS-232C port, an optical audio terminal, an HDMI (High-Definition Multimedia Interface) port, and the like. By connecting the external connection device 929 to the access port 923, the electronic apparatus 10 directly acquires various kinds of data from the external connection device 929 or provides various kinds of data for the external connection device 929.

The communication device 925 is, for example, a communication interface formed of a communication device or the like for connecting to the communication network 931. The communication device 925 is, for example, a communication card for wired or wireless LAN (Local Area Network), Bluetooth (registered trademark), or WUSB (Wireless USB). The communication device 925 may be a router for optical communication, a router for ADSL (Asymmetric Digital Subscriber Line), or a modem for various kinds of communication. For example, the communication device 925 may transmit and receive signals to and from the Internet or another communication device, for example, on the basis of a predetermined protocol such as TCP/IP. The communication network 931 connected to the communication device 925 is formed of a network connected by wire or wirelessly, for example, the Internet, home LAN, infrared communication, radio wave communication, or satellite communication.

An example of the hardware configuration capable of realizing the functions of the electronic apparatus 10 according to the embodiment of the disclosure has been described above. The constituent elements described above may be configured using generic members, and may be configured by hardware specialized in the function of each constituent element. Accordingly, the used hardware configuration may be appropriately modified according to the technical level when embodying the embodiment.

The hardware configuration of the information determining server 20 according to the embodiment is the same as the hardware configuration of the electronic apparatus 10 according to the embodiment of the disclosure, and the detailed description thereof is omitted.

CONCLUSION

As described above, according to the embodiments of the disclosure, the user only carries and moves the electronic apparatus, and thus the electronic apparatus can automatically determine the life zones such as home, the work place or school, the used shopping spot or sports facility, and the meal place of the user. By using the information about the life zone, it is possible to provide the information closely related to life when the user is located within the life zone, and it is possible to provide the information such as leisure when the user comes out of the life zone.

Accordingly, in the embodiment of the disclosure, it is possible to provide the information based on a time, place, and occasion of the user, and it is possible to change widely the lifestyle of the user.

The present disclosure contains subject matter related to that disclosed in Japanese Priority Patent Application JP 2010-180797 filed in the Japan Patent Office on Aug. 12, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. At least one apparatus comprising:
at least one processor; and
at least one memory, storing instructions which, when executed by the at least one processor, cause the at least one apparatus to:
access information identifying a first device location of a first device associated with a user at a first time;
store the first device location information and information identifying the first time in a location history;

access information identifying a second device location of the first device at a second time;

store, in the location history, the second device location information and information identifying the second time;

determine a category of a location based at least in part on the location history and personal information associated with the user, the category of the location comprising a lifezone;

select information based at least in part upon the determined category of the location;

determine whether a current device location is in a lifezone, based at least in part on the location history, to obtain a determination result; and control a display so as to display the determination result.

2. The at least one apparatus of claim 1, wherein the location history is stored on a device associated with the user.

3. The at least one apparatus of claim 1, wherein the category comprises at least one of a home, a work place, a school, a transportation area, a meal area, a shopping area, a sports area, or an entertainment area.

4. The at least one apparatus of claim 1, wherein the at least one memory stores instructions which, when executed by the at least one processor, cause the at least one apparatus to:

send the first device location and the second device location to a server; and receive a range of a lifezone from the server.

5. The at least one apparatus of claim 4, wherein the at least one memory stores instructions which, when executed by the at least one processor, cause the at least one apparatus to:

determine information identifying a third location associated with the user;

send, to the server, a request for information associated with the third location; and receive, from the server, information associated with the third location.

6. The at least one apparatus of claim 5, wherein the at least one memory stores instructions which, when executed by the at least one processor, cause the at least one apparatus to:

display the information associated with the third location.

7. The at least one apparatus of claim 1, wherein the category is a first category of a first visited location associated with the user.

8. The at least one apparatus of claim 7, wherein the at least one memory stores instructions which, when executed by the at least one processor, cause the at least one apparatus to:

store, in a category history, information identifying the first category and information identifying the first visited location;

determine, based on the location history, a second category of a second visited location, the second visited location being associated with the user; and store, in the category history, information identifying the second category and information identifying the second visited location.

9. The at least one apparatus of claim 8, wherein the at least memory stores instructions which, when executed by the at least one processor, cause the at least one apparatus to:

receive, from the first device, a request for information associated with a third location associated with the user;

acquire information associated with the third location;

select a subset of the acquired information; and send the subset to the first device.

10. The at least one apparatus of claim 9, wherein the subset is selected based on the category history.

11. The at least one apparatus of claim 9, wherein the subset is selected based on the request.

12. The at least one apparatus of claim 1, wherein the at least one processor is programmed via the instructions to:

process the category of the location based on the location history and the personal information associated with the user, wherein the personal information includes a gender of the user, a home address of the user, a zip code associated with the user, a phone number or a date of birth of the user.

13. The at least one apparatus of claim 1, wherein the at least one memory stores instructions which, when executed by the at least one processor, cause the at least one apparatus to:

if a current user location information indicates that user location belongs in a lifezone, control a display to display information based on the lifezone; and if a current user location information indicates that user location belongs out of a lifezone, control the display to display information based on the current user location.

14. The at least one apparatus of claim 1, wherein the at least one memory stores instructions which, when executed by the at least one processor, cause the at least one apparatus to:

if a current user location information indicates that user location belongs in a lifezone, control a display to display information of a store belonging to the lifezone; and if a current user location information indicates that user location belongs out of a lifezone, control the display to display information including at least one of travelling information or leisure information.

15. A method for determining a category of a location, comprising:

accessing information identifying a first device location of a first device associated with a user at a first time;

storing the first device location information and information identifying the first time in a location history;

accessing information identifying a second device location of the first device at a second time;

storing, in the location history, the second device location information and information identifying the second time;

determining a category of a location based at least in part on the location history and personal information associated with the user, the category of the location comprising a lifezone;

selecting information based at least in part on the determined category of the location;

determining whether a current device location is in a lifezone, based at least in part on the location history, to obtain a determination result; and controlling a display so as to display the determination result.

16. The method of claim 15, wherein the location history is stored on a device associated with the user.

17. The method of claim 15, wherein the category comprises at least one of a home, a work place, a school, a transportation area, a meal area, a shopping area, a sports area, or an entertainment area.

18. The method of claim 15, wherein the method further comprises:

sending the first device location and the second device location to a server; and receiving a range of a lifezone from the server.

19. The method of claim 18, wherein the method further comprises:
   determining information identifying a third location associated with the user;
   sending, to the server, a request for information associated with the third location; and
   receiving, from the server, information associated with the third location.

20. The method of claim 19, wherein the method further comprises:
   displaying the information associated with the third location.

21. The method of claim 15, wherein the category is a first category of a first visited location associated with the user.

22. The method of claim 21, wherein the method further comprises:
   storing, in a category history, information identifying the first category and information identifying the first visited location;
   determining, based on the location history, a second category of a second visited location, the second visited location being associated with the user; and
   storing, in the category history, information identifying the second category and information identifying the second visited location.

23. The method of claim 22, wherein the method further comprises:
   receiving, from the first device, a request for information associated with a third location associated with the user;
   acquiring information associated with the third location;
   selecting a subset of the acquired information; and
   sending the subset to the first device.

24. The method of claim 23, wherein the subset is selected based on the category history.

25. The method of claim 23, wherein the subset is selected based on the request.

26. The method of claim 15, wherein the method further comprises:
   processing the category of the location based on the location history and the personal information associated with the user, wherein the personal information includes a gender of the user, a home address of the user, a zip code associated with the user, a phone number or a date of birth of the user.

27. The method of claim 15, wherein the method further comprises:
   if a current user location information indicates that user location belongs in a lifezone, controlling a display to display information based on the lifezone; and
   if a current user location information indicates that user location belongs out of a lifezone, controlling the display to display information based on the current user location.

28. The method of claim 15, wherein the method further comprises:
   if a current user location information indicates that user location belongs in a lifezone, controlling a display to display information of a store belonging to the lifezone; and
   if a current user location information indicates that user location belongs out of a lifezone, controlling the display to display information including at least one of travelling information or leisure information.

29. At least one non-transitory computer-readable medium storing instructions which, when executed by at least one computer, cause the at least one computer to perform a method of determining a category of a location, the method comprising:
   accessing information identifying a first device location of a first device associated with a user at a first time;
   storing the first device location information and information identifying the first time in a location history;
   accessing information identifying a second device location of the first device at a second time;
   storing, in the location history, the second device location information and information identifying the second time;
   determining a category of a location based at least in part on the location history and personal information associated with the user, the category of the location comprising a lifezone;
   selecting information based at least in part on the determined category of the location;
   determining whether a current device location is in a lifezone, based at least in part on the location history, to obtain a determination result; and
   controlling a display so as to display the determination result.

30. The at least one apparatus of claim 1, wherein determining the category of the location comprises determining the category of the location from a portion of the location history for a duration of time that is equal to or greater than a predetermined period of time, wherein the predetermined period of time depends on a type of activity associated with the category of the location.

31. The at least one apparatus of claim 1, wherein determining the category of the location comprises determining the category of the location based on a type of day associated with the first device location and/or a type of day associated with the second device location.

* * * * *